(12) United States Patent
Vannithamby et al.

(10) Patent No.: US 10,848,584 B2
(45) Date of Patent: Nov. 24, 2020

(54) ROUTING IN AN INFORMATION-CENTRIC NETWORK

(71) Applicant: Intel Corporation, Santa Clara, CA (US)

(72) Inventors: Rath Vannithamby, Portland, OR (US); Ren Wang, Portland, OR (US); Nageen Himayat, Fremont, CA (US); Eve M. Schooler, Portola Valley, CA (US); Vallabhajosyula S. Somayazulu, Portland, OR (US); Christian Maciocco, Portland, OR (US); Srikathyayani Srikanteswara, Portland, OR (US); David John Zage, Fremont, CA (US); Sebastian Schoenberg, Hillsboro, OR (US); Andrew Stephen Brown, Hillsboro, OR (US); Maruti Gupta Hyde, Portland, OR (US); Jessica C. McCarthy, Dublin (IE)

(73) Assignee: Intel Corporation, Santa Clara, CA (US)

(*) Notice: Subject to any disclaimer, the term of this patent is extended or adjusted under 35 U.S.C. 154(b) by 770 days.

(21) Appl. No.: 15/414,459

(22) Filed: Jan. 24, 2017

(65) Prior Publication Data

US 2018/0145907 A1    May 24, 2018

Related U.S. Application Data

(60) Provisional application No. 62/424,985, filed on Nov. 21, 2016.

(51) Int. Cl.
*H04L 29/08*    (2006.01)
*G06F 16/23*    (2019.01)
(Continued)

(52) U.S. Cl.
CPC .......... *H04L 67/2842* (2013.01); *G06F 16/23* (2019.01); *G06F 16/9574* (2019.01); *H04L 29/08* (2013.01); *H04L 41/5006* (2013.01); *H04L 41/5009* (2013.01); *H04L 41/5025* (2013.01); *H04L 41/5035* (2013.01);
(Continued)

(58) Field of Classification Search
None
See application file for complete search history.

(56) References Cited

U.S. PATENT DOCUMENTS

| 2012/0159176 A1* | 6/2012 | Ravindran | ............ H04L 63/104 |
| | | | 713/176 |
| 2014/0195641 A1* | 7/2014 | Wang | .................... H04L 67/327 |
| | | | 709/217 |

(Continued)

*Primary Examiner* — Kodzovi Acolatse
(74) *Attorney, Agent, or Firm* — Schwegman Lundberg & Woessner, P.A.

(57) ABSTRACT

Generally discussed herein are systems, devices, and methods for routing interests and/or content in an information centric network. A router can include a memory and routing circuitry coupled to the memory, the routing circuitry configured to receive a packet, receive one or more attributes including at least one of (1) a network attribute, (2) a platform attribute, and (3) a content attribute, determine which neighbor node is to receive the packet next based on the received one or more attributes, and forward the packet to the determined neighbor node.

23 Claims, 12 Drawing Sheets

(51) Int. Cl.
*H04L 12/24* (2006.01)
*G06F 16/957* (2019.01)
*H04L 12/26* (2006.01)
*H04L 29/06* (2006.01)
*H04L 12/841* (2013.01)
*H04L 12/773* (2013.01)
*H04L 12/741* (2013.01)
*H04L 12/813* (2013.01)
*H04L 29/12* (2006.01)
*H04L 12/721* (2013.01)
*H04L 12/911* (2013.01)
*H04L 12/715* (2013.01)

(52) U.S. Cl.
CPC .............. *H04L 43/12* (2013.01); *H04L 43/16* (2013.01); *H04L 45/04* (2013.01); *H04L 45/14* (2013.01); *H04L 45/60* (2013.01); *H04L 45/74* (2013.01); *H04L 47/20* (2013.01); *H04L 47/286* (2013.01); *H04L 47/783* (2013.01); *H04L 61/2076* (2013.01); *H04L 67/10* (2013.01); *H04L 67/1097* (2013.01); *H04L 67/12* (2013.01); *H04L 67/16* (2013.01); *H04L 67/2876* (2013.01); *H04L 67/327* (2013.01); *H04L 67/42* (2013.01); *H04L 69/22* (2013.01)

(56) References Cited

U.S. PATENT DOCUMENTS

| | | | |
|---|---|---|---|
| 2015/0039784 A1* | 2/2015 | Westphal | H04L 45/306 709/240 |
| 2015/0056995 A1* | 2/2015 | Baillargeon | H04W 36/0022 455/436 |
| 2015/0106730 A1* | 4/2015 | Wang | H04L 12/1822 715/740 |
| 2015/0319241 A1* | 11/2015 | Scott | H04L 67/2842 709/214 |
| 2015/0381546 A1* | 12/2015 | Mahadevan | H04L 67/025 709/207 |
| 2016/0021172 A1* | 1/2016 | Mahadevan | G06F 16/285 709/204 |
| 2016/0085830 A1* | 3/2016 | Mahadevan | G06F 16/43 707/730 |
| 2016/0212066 A1* | 7/2016 | Ravindran | H04L 47/80 |
| 2016/0255180 A1* | 9/2016 | Bae | H04L 67/327 370/474 |
| 2018/0046667 A1* | 2/2018 | Wood | H04L 67/1097 |
| 2018/0146059 A1 | 5/2018 | Schoenberg et al. | |

* cited by examiner

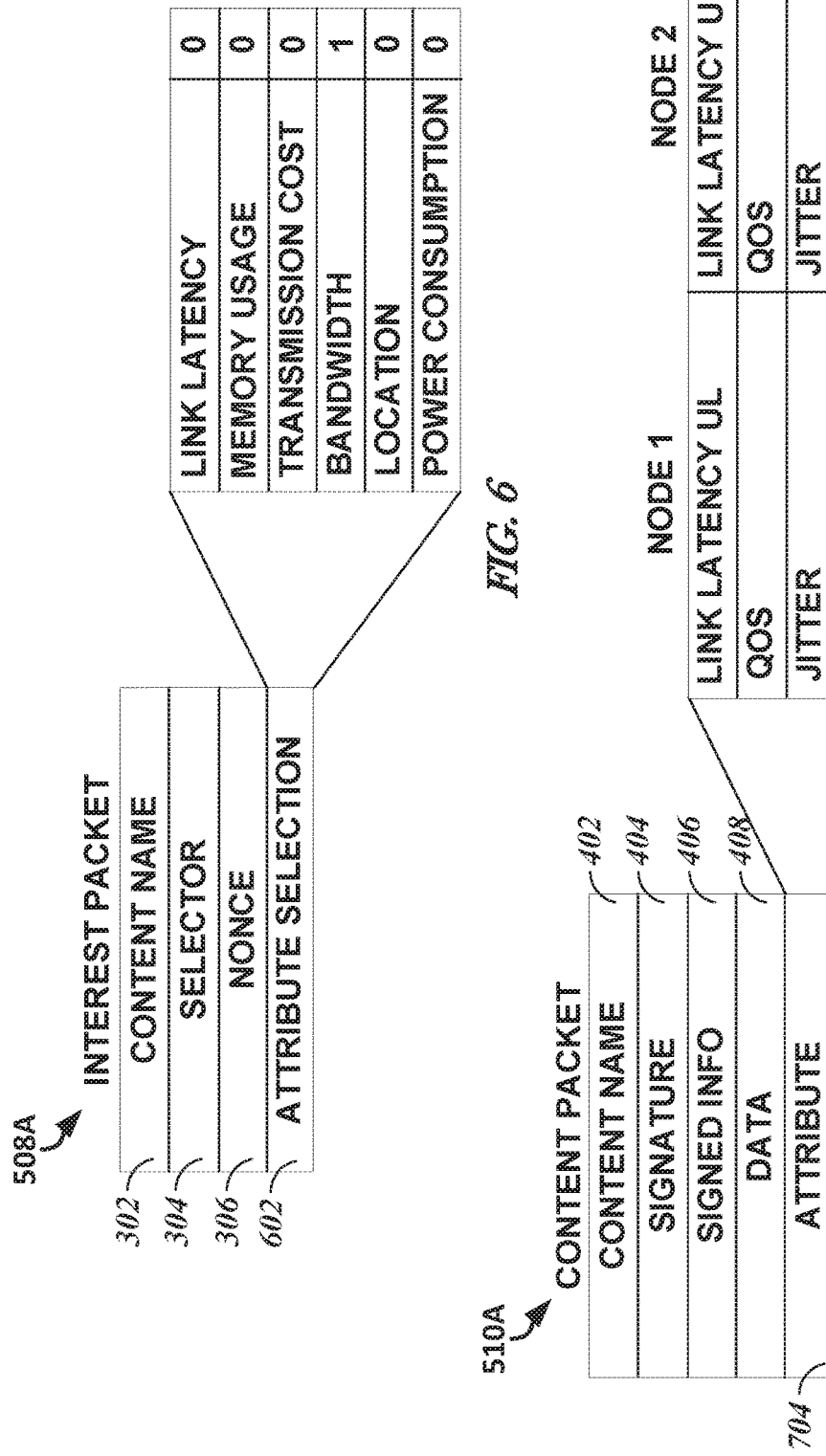

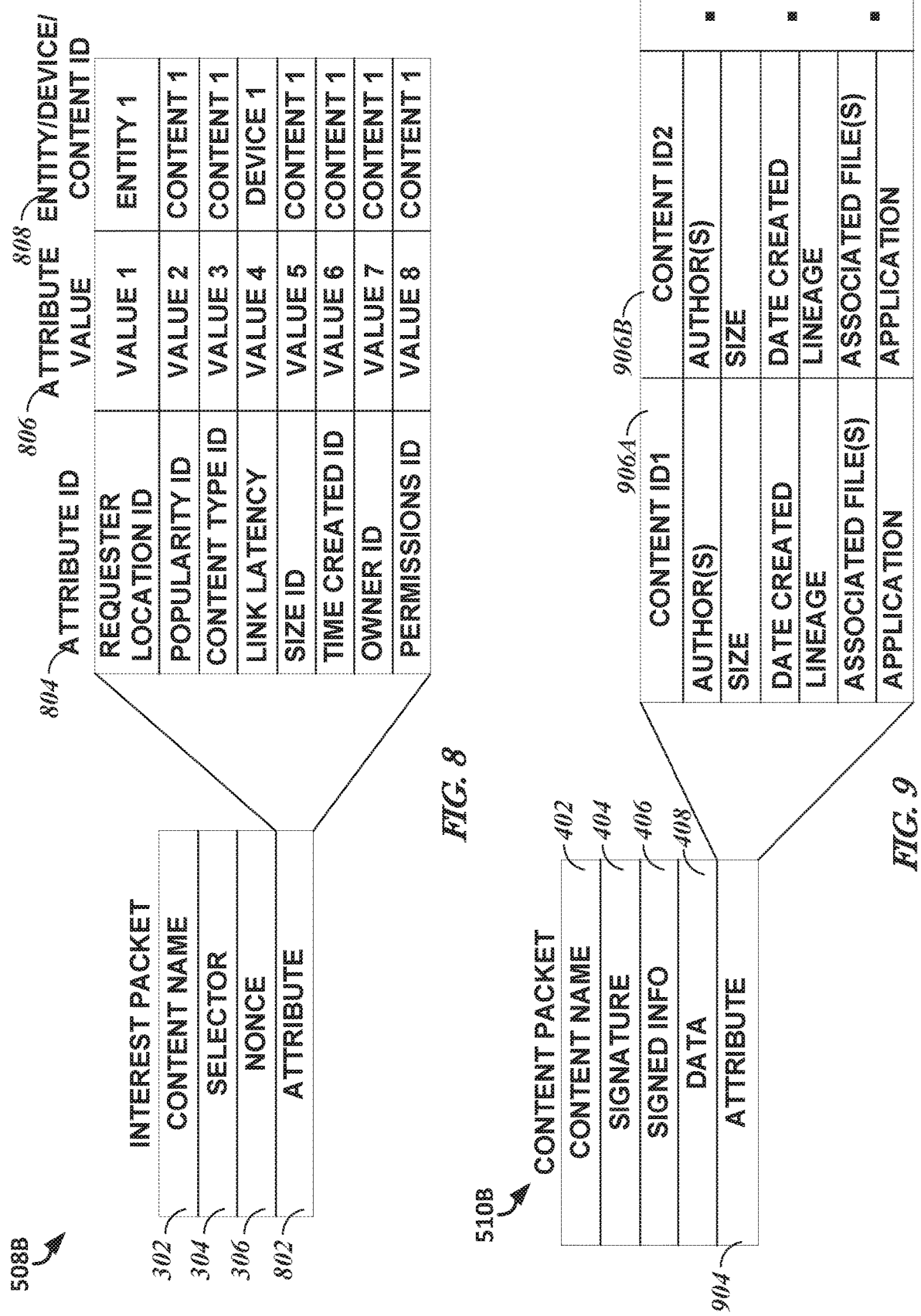

FIB TABLE

| NAME | NEXT |
|---|---|
| URL1 | ROUTER B |
| URL2 | PUBLISHER 1 |

FIB TABLE

| NAME | NEXT | LINK LATENCY | TYPE OF LINK | QOS | ERROR | BANDWIDTH |
|---|---|---|---|---|---|---|
| URL1 | DEVICE B UL | 3 | CELLULAR | 9 | 0.1% | HIGH |
| URL1 | DEVICE A UL | 2 | WIFI | 1 | 0.3% | LOW |
| URL1 | DEVICE B DL | 4 | CELLULAR | 7 | 0.2% | HIGH |
| URL1 | DEVICE A DL | 2 | WIFI | 2 | 0.3% | LOW | ns
ROUTING IN AN INFORMATION-CENTRIC NETWORK

REFERENCE TO RELATED APPLICATION

This application claims the benefit of priority to provisional patent application No. 62/424,985, filed on Nov. 21, 2016, which is incorporated by reference herein in its entirety.

TECHNICAL FIELD

Embodiments generally relate to computer networks and, more particularly, to systems, devices, and methods for data routing in information-centric networks.

TECHNICAL BACKGROUND

A network architecture can include node communication based on Internet Protocol (IP) addresses. This type of architecture is sometimes referred to as a host-oriented network (HON). A HON includes respective conversations between respective source and destination devices, one wishing to access to a resource and one providing access to the resource. IP packets thus identify a source and destination for each packet. A lot of internet traffic is comprised of conversations between sources and destination devices using Transmission Control Protocol (TCP).

This HON may not be a best match for some communications. A lot of internet communications regard access to content. An information centric network (ICN) architecture may provide more reliable and/or efficient communication between devices as compared to a HON. An ICN allows content to be named at a network layer, as opposed to IP addresses as allowed by the HON.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates, by way of example, a logical diagram of an embodiment of an extended interest packet.

FIG. 7 illustrates, by way of example, a logical diagram of an embodiment of an extended content packet.

FIG. 8 illustrates, by way of example, a logical diagram of an embodiment of another extended interest packet.

FIG. 9 illustrates, by way of example, a logical diagram of an embodiment of another extended content packet.

DESCRIPTION OF EMBODIMENTS

Figure 2:
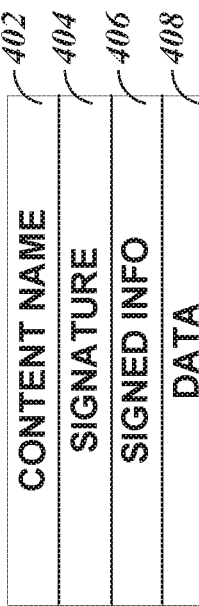
FIG. 2 illustrates, by way of example a logical block diagram of an embodiment of ICN layers in an ICN network.

Examples in this disclosure relate to devices, systems, and methods that include routing interests and/or content, such as in an information centric network (ICN).

ICNs shift the paradigm from node endpoint-addressed routing of data to a routing based on named content. In an ICN, the name of the content is used to route data in response to interests. Since addressing is based on a content name an interest name), the source where data is served from becomes secondary in an ICN. This allows for various optimization options, for example caching data natively in the network at "arbitrary" nodes of the system (e.g., any node capable of serving an interest packet). An interest packet can be served from the closest cache source that includes the content requested. The content in the cache could have been moved there pro-actively based on content popularity count, a user's geo-location, least costly in terms of total access latency for devices/users that access the data, bandwidth source, network system optimization and/or reliability/capacity of the cache device.

This sort of "in-network caching" can provide flexibility in what to cache and where, what content to migrate where and when, what to discard and when, or the like. Discussed herein are caching and processing optimizations in ICN to allow for cost efficient and/or storage efficient caching. Such caching techniques can be helpful, especially given the huge amount of data generated by internet of things (IoT) devices, such as can be located at an edge of the network.

In contrast to a HON, in an ICN nodes communicate based on named content, instead of IP addresses. In a HON a packet includes a header that defines a destination and includes a payload (data) to be transported to the destination. In ICN an interest, or content request message, is issued and a content object, or content return message, sometimes called a content packet, is returned. The content of the content packet can reside in and be retrieved from a distributed memory (e.g., distributed caches or other memories).

Some basic differences between a HON and an ICN can include one or more of: (1) They use different name spaces. A HON uses IP address and an ICN uses content names. (2) An ICN includes a security primitive directly at the narrow waist (layer four, the transport layer), such as can include a signed content packet, whereas no such security exists by default at layer four in the HON. (3) A HON sends packets to destination addresses, while an ICN uses Interest packets to fetch Data packets from sources (or intermediate nodes that previously received the data packets from sources or from other relay nodes). (4) A HON has a stateless data plane, while an ICN has a stateful data plane.

An ICN can include network devices, data (sometimes referred to as content), users, original content providers (that can be servers for example for Internet video content or small devices for example for IoT) etc., which may have different storage capabilities and requirements. For example, a first device may have more internal storage than it needs to perform its operations, while a second device in the same network may be able to perform more reliably and/or efficiently with some more storage space available for access by the first device.

Embodiments herein can include an addition and/or a modification to how data is published to one or more memories of an ICN, such as can include a dedicated memory device and/or a memory of an internet of things (IoT) or other processing device of the network. In one or more embodiments, the data (sometimes referred to as content) in a memory (sometimes referred to as a content store) can be stored with attributes. The attributes can indicate a device from which the content originated, a service level agreement (SLA), a time span for the data to remain in the content store, whether the content is durable, an expected response latency, a type indicating whether the device has wired and/or wireless communication capability, a type of content (e.g., whether the content is to be streamed or is static), or other attributes.

In contrast, current ICN content stores do not include such attributes. Such attributes can be used in determining whether the data can be moved to a different content store, such as without violating the SLA, for example. Such attributes can travel with the content, such as to retain attribute information that can be used for determining whether the content can be moved, removed from the content store, and/or otherwise altered (in terms of content and/or location).

A current implementation of a content store (CS) replacement technique in an ICN can include tiers: (1) replace unsolicited content packets, (2) replace expired content packets, and (3) replace oldest content packets (e.g., first in first out (FIFO)). In contrast to the tiered approach, data in a cache can be populated probabilistically, such as discussed herein. In contrast to this deterministic, tiered approach, one or more embodiments discussed herein provide a probabilistic retention. In one or more embodiments, the probabilistic retention can be aligned with a Service Level Agreement (SLA) and/or Service Delivery Agreement (SDA).

An SLA is a contract that defines what a customer will receive from a service provider (either internal or external). The SLA defines the level of service expected from the service provider. An SLA is sometimes referred to as an SDA.

Probabilistic retention can include a more flexible implementation as compared to a tiered retention approach. In the probabilistic retention, different namespaces may have different SLAs, so the CS can be configurable by name prefix and based on the SLA (e.g., /a/b/c has 90% retention, /d/e/f has 99.999%). This raises the problem that the retention policies will collide and that the CS may enter an error state where, for example due to a high volume of traffic, the CS cannot maintain its guarantees (an overbooking problem).

This problem exists both when using multiple namespaces and a single namespace. To signal this to the user, a retention-enabled CS can be extended with an application programming interface (API), such as to alert an application and/or user of a failure to maintain SLA requirements.

As previously discussed, a HON is different from an ICN. FIGS. 1-4 describe differences between the HON and the ICN and basic structures that are used in an ICN.

Figure 1:
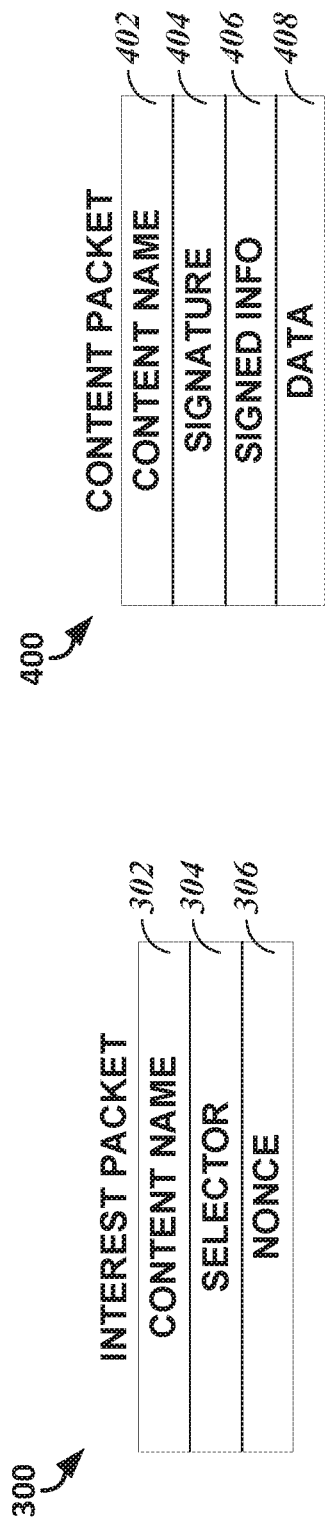
FIG. 1 illustrates, by way of example, a logical block diagram of an embodiment of host oriented network (HON) layers in a host-oriented network.

FIG. 1 illustrates, by way of example, a logical block diagram of an embodiment of layers 100 of a HON. FIG. 2 illustrates, by way of example a logical block diagram of an embodiment of layers 200 of an ICN. The stacks illustrated are merely examples and do not preclude ICN from being over lower layers of a network. The typical open systems interconnect (OSI) model is broken into seven layers. The seven layers include the physical layer 102 (layer one), data link layer 104 (layer two), network layer 106 (layer three), transport layer 108 (layer four), session layer 110 (layer five), presentation layer 112 (layer six), and application layer 114 (layer seven). In the seven layer model the physical layer is referred to as layer one and the application layer is layer seven with layers numbered in order therebetween. When an item is said to be in a lower layer, that means that the item is in a layer with a lower number than the layer being referenced. For example, a lower layer relative to the transport layer (layer four) includes the network layer, data link layer, and/or the physical layer. A higher layer relative to the transport layer (layer four) includes the session layer, the presentation layer, and/or the application layer.

The HON layer 100 and the ICN layer 200 include copper, fiber, radio, or the like at a physical layer 102 and 202 (layer one). This layer is the same in both the HON and the ICN. The HON layers 100 as illustrated include a physical layer 202, a data link layer 204, a network layer 206, a transport layer 208, and an application layer 210.

Figure 3:
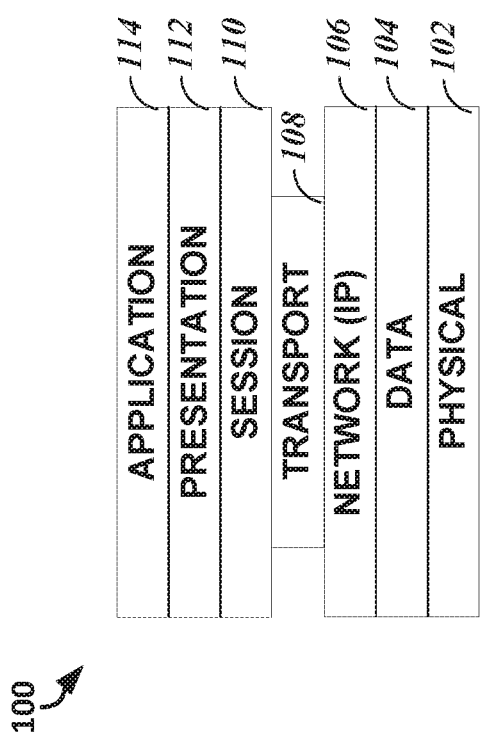
FIG. 3 illustrates, by way of example, a logical block diagram of an embodiment of an interest packet.

In an ICN, an interest packet is issued by a user interested in obtaining content and a data packet including the requested content can be provided to fulfill the interest indicated (by content name) in the interest packet. FIG. 3 illustrates, by way of example, a logical block diagram of an embodiment of an interest packet 300. The interest packet 300 includes fields that allow a user to define the content requested in the interest packet 300. The fields, as illustrated, include a content name 302, a selector 304, and a nonce field 306. A content object can be named, by a content publisher or user, such as by using a hierarchy of binary name segments. A requested content (content identified by content name in an interest packet) need not be perfectly defined. For example, a user can indicate a portion of the content name and use a "wildcard" indicator to identify that the content name is incomplete. In another example, the content name can be complete except for the extension (e.g., ".pdf", ".doc", ".mp3", or the like) and a wild card can be used in place of the extension. In such instances, the router can attempt to retrieve the highest quality format that is available and in a format compatible with the device that issued the interest packet. Attributes of the device are discussed elsewhere herein. The selector allows a user to specify a specific source for the content associated with the content name or otherwise be more specific with regard to a scope of data to be returned in response to the interest packet 300. The nonce field 306 can be used to limit an amount of time the interest packet 300 persists before being discarded, ensure that the content is authentic (e.g., originates from a specified publisher, is a specified version, has not been tampered with or otherwise altered, or the like).

Figure 4:
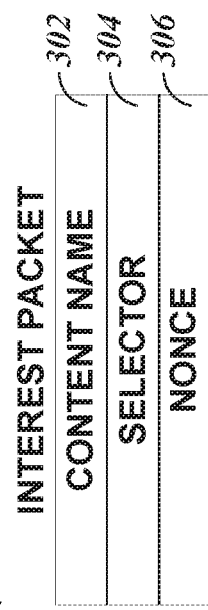
FIG. 4 illustrates, by way of example, a logical block diagram of an embodiment of a data packet, sometimes referred to as a content packet.

FIG. 4 illustrates, by way of example, a logical block diagram of an embodiment of a content packet 400. The content packet 400 can include fields that allow a user issuing a corresponding interest packet to verify the content is authentic, provide security for the content requested, and/or provide the requested content to the requester. The fields as illustrated include a content name 402, a signature 404, a signed information 406, and data 408 (e.g., the requested content, such as in an encrypted, compressed, unencrypted, and/or uncompressed format).

The content name 402 can be the same as the content name 302. In some ICN configurations, a user does not need to define a complete content name, and in such instances the content name 302 can be different from the content name 402. The signature 404 can include a cryptographic signature that binds the content name to a payload (the data 408). The user that issued the interest packet 300 can access the data 408 if the user has a key of the publisher, such as can be determined using data from the signature 404 or the signed information 406. In one or more embodiments, the data required to access the content can be provided in the interest packet 300, such as in the nonce 306 field. The signed information 406 can include an indication of how the content is compressed or encrypted or data indicating that the content in the data 408 is authentic. The signed information 406 can include an identification of the publisher, a location of a key that can be used to decrypt the data 408 and/or verify the authenticity of the data 408, an amount of time after which (or a specified time at which) the data becomes "stale" (e.g., no longer relevant or superseded by more accurate data), or the like.

The ICN network routes the interest packet 300 and a pending interest table (PIT) of the interest packet 300 (not shown) is updated to record a path of the interest packet 300 through the network. After finding a content object that includes a name that sufficiently matches the name specified in the interest, the content object is routed back to the issuer, such as in the content packet 400, by reversing the path specified in the PIT (in current ICN routing techniques).

Current ICN routing devices operate independent of (1) attributes of the infrastructure the devices are operating over, (2) attributes of the devices sending and receiving content, and (3) attributes of the applications utilizing ICN. This independence can cause a sub-optimal selection of one or more data path(s) (request and/or return paths). The sub-optimal selection of data paths can reduce performance of the ICN system, such as by increasing lag time between object request and object receipt.

One current problem is that there is no circuitry available at the ICN network level that can help improve the intelligence of the routing. Such circuitry could help use at least some attribute information. The attribute information can be readily available for intra-domain and/or inter-domain packet routing.

Figure 5:
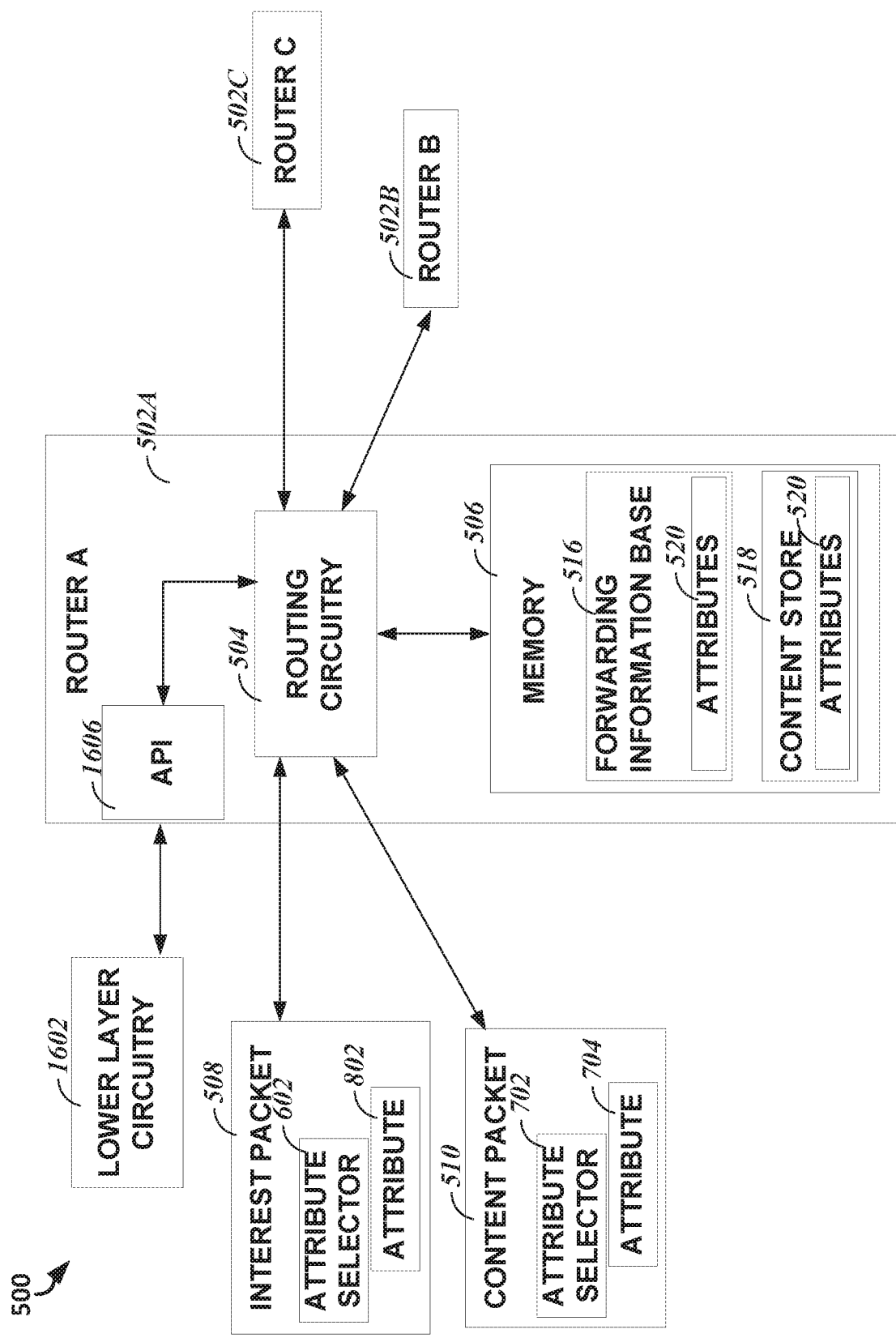
FIG. 5 illustrates, by way of example, a logical block diagram of an embodiment of a system that can route packets (e.g., interest packets and/or content packets) based on one or more attributes.

FIG. 5 illustrates, by way of example, a logical block diagram of an embodiment of a system 500 that can route interest packets 508 and content packets 510 based on one or more attributes. The system 500 as illustrated includes a plurality of routers 502A, 502B, and 502C. The router 502A is shown in an exploded view to illustrate components of the router 502A. Any of the other routers 502B-C can include similar components, such as to perform similar or the same operations. The router 502A receives an interest packet 508 or content packet 510 and determines where to route the packet 508 or 510 next, such as can be determined by the routing circuitry 504. A router is a networking device that traffics data between devices.

The routing circuitry 504 can include electric or electronic components, such as can include one or more transistors, resistors, capacitors, inductors, diodes, regulators (e.g., current, voltage, and/or power regulators), multiplexers, logic gates, switches, buffers, amplifiers, oscillators, modulators, demodulators, interconnects (e.g., wired or wireless signal transfer mechanisms), or the like. The routing circuitry 504 can include an application specific integrated circuitry (ASIC), a programmable gate array (e.g., a programmable chip, such as can include a field programmable gate array (FPGA)), or the like. The routing circuitry 504 can be configured as a state machine configured to receive one or more attributes of the routers 502B-C as inputs and produce a result indicating which router 502B-C to which the packet 508 or 510 is to be routed.

The router A 502A, as illustrated, further includes a memory 506 that includes content 518 and a forwarding information base (FIB) 516, such as can include an extended FIB. Examples of extended FIBs are discussed elsewhere herein. The content 518 can include content that can be requested by a user, such as by issuing an interest packet 508.

The FIB 516 includes data that can be used as input to the routing circuitry 504. The FIB 516 can include attributes of one or more routers, such as neighboring routers (e.g., routers only one hop away from the router 502A) and/or other routers (e.g., routers more than one hop away from the router 502A). The attributes in the 516 can include platform attributes or other attributes, such as are discussed elsewhere herein.

The interest packet 508 can be an extended interest packet, such as can include an attribute selection field and/or an attribute field. Examples of such packets are shown in other FIGS. and discussed elsewhere herein. The attribute field 802 can be used to communicate one or more platform, content, and/or application attributes to a router that receives the interest packet 508. The routing circuitry 504 can read the attributes field 802 and/or attribute selection field 602, store attribute data provided in the attribute field, and/or route the interest packet 508 based on attributes in the interest packet 508, the FIB 516, the content 514, or other attributes that can be stored in the memory 506.

The content packet 510 can be an extended content packet, such as can include an attribute selection field 702 and/or an attribute field 704. Examples of such packets are shown in other FIGS. and discussed elsewhere herein. The attribute field 704 can be used to communicate one or more platform, network, and/or content attributes to a router that receives the content packet 510. The routing circuitry 504 can read the attributes field, store attribute data provided in the attribute (as desired), and route the interest packet 508 based on attributes in the content packet 510, the FIB 516, the content 514, or other attributes, such as can be stored in the memory 506.

The system 1600 as illustrated includes lower layer circuitry 1602 and an API 1606. The lower layer circuitry 1602 includes circuitry to implement one or more of the layers 202, 204, and 206. The lower layer circuitry 1602, in one or more embodiments, can include electric or electronic components, such as can include components similar to that discussed with regard to the routing circuitry 504. The lower layer circuitry 1602 can monitor performance of packet transit in the content layer 208. The performance can be recorded as one or more attributes that can be provided to the router 502 and/or the policy server 1402 (see FIG. 14). The attributes can include a QoS, a link latency, a type of connectivity interface available at the router, different attributes for UL and DL using the interface, or other network attributes as discussed herein. Device attributes, such as a location of the device that issued an interest packet, can be determined at a first layer 202 and provided to the content layer 208, such as by communicating the location through the lower layers. In one or more embodiments, the lower layer circuitry 1602 can be a part of the router 502.

The API 1606 provides an interface through which the lower layer circuitry 1602 can communicate with the routing circuitry 504 and vice versa. The API 1606 provides a layer of abstraction such that the routing circuitry 504 does not need to know what format data provided to the lower layer circuitry 1602 needs to conform to and vice versa.

Reference will be made to FIG. 5 in describing some of the remaining FIGS. Numerals with suffixes are specific instances of a numeral with a suffix. For example, the extended interest packet 508A is a specific instance of the interest packet 508.

One or more embodiments include identifying, such as by the routing circuitry 504, one or more of a variety of attributes of an ICN infrastructure, such as can include platform attributes (e.g., attributes associated with one or more devices connected in the ICN), network attributes (e.g., attributes regarding connections between devices of the network), application attributes (e.g., applications utilizing the ICN), and/or content attributes (e.g., content requested in an interest packet 508 or being returned in a content packet 510). One or more embodiments regard mechanisms for the routing circuitry 504 to be aware of such attributes.

The routing circuitry 504 can make routing decisions and route the content packet 510 and/or interest packet more intelligently than prior ICNs or routers in ICNs. The routing circuitry 504 along with the attributes can help improve user experience and/or system performance.

As is already discussed, embodiments discussed herein make various types of attributes available to an ICN routing mechanism (the router 502A-C) so that the routing mechanism can make more informed routing decisions. The types of attributes can be categorized as: (A) platform attributes (e.g., central processing unit (CPU) load, memory availability, cache size, or the like), (B) network attributes (e.g., physical network link quality, delay, congestion, proximity, uptime, or the like), and/or (C) content attributes (e.g., name, type of content, size of content, location of content, quality/volume, popularity of the content, expiration (e.g., TTL), policy, lineage, or the like). One or more of the sets of attributes or just one or more of the individual attributes of a given set or set(s) can be used by the routing mechanism in making a routing decision.

One or more platform attributes can be made available, such as by measurement and/or monitoring, such as by a lower layer. The measurement(s) and/or monitored attributes can be provided to a layer, such as the routing layer (layer three) or other layer of an ICN, such as through an application programming interface (API). A platform attribute in general includes attributes of a device, such as a node (e.g., a computer, router, access point, or the like) in the ICN. Platform attributes can include one or more of power availability, power consumption, compute load, compute availability, memory usage, location of the device, transmission cost, and/or the like. The platform attributes can be provided in the FIB 516, the interest packet 508, the content packet 510, and/or another spot in the memory 506. The routing circuitry 504 can retrieve the platform attribute associated with a potential next destination (one of the routers 502B-C in the example of FIG. 5).

Figure 14:
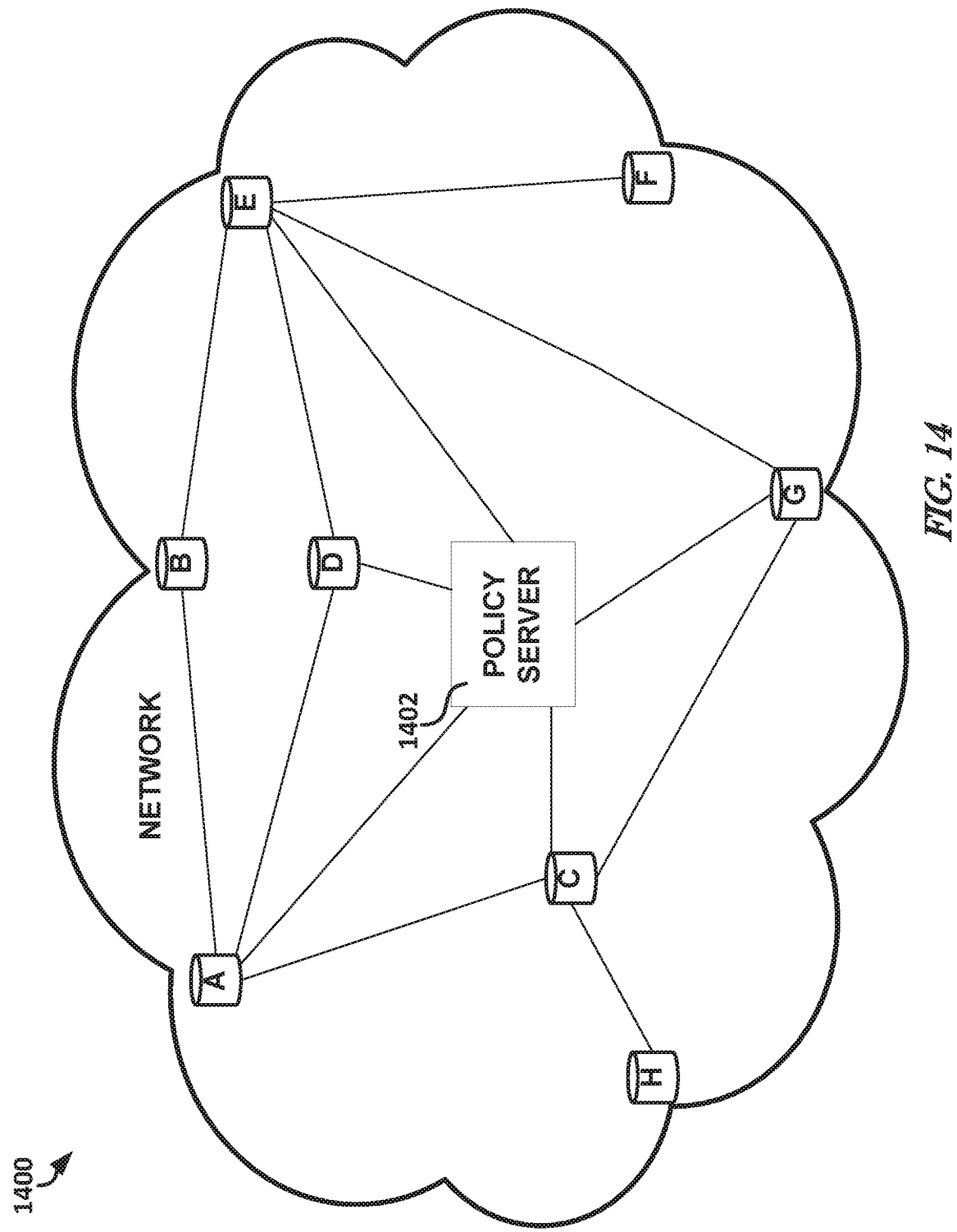
FIG. 14 illustrates, by way of example, a logical block diagram of an embodiment of a system that includes intra-network routing.

ICN routers are currently unaware of at least some of the performance characteristics of the underlying physical connectivity (for both wired and/or wireless networks). Such attributes are considered network attributes. Such routers can have a routing time and resource intensive performance that can be improved upon if such characteristics are made available at the router 502A. The ICN can include multiple connectivity available in the physical medium, such as is illustrated in FIG. 14. The multiple connectivity can include one or more of wireless fidelity (WiFi), 4G, 5G, wired (e.g., Ethernet, Universal Serial Bus (USB), or other wired connection, or the like). The network attributes, such as throughput, delay, jitter, wired vs wireless connection, capacity, bandwidth, or the like, of these possible connectivity can be provided to a node issuing the interest packet 508 or the content packet 510 or at the routing circuitry 504. Making routing decisions based on the network attributes can improve performance of the ICN.

The content requested in the interest packet 508, provided in the content packet 510, and/or stored in the memory 506 may be described by a number of different content attributes, such as name, type, quality, size, time of creation, owner, permission for usage, popularity of content or the like. Other content attributes can include a requesting device desired priority about receiving the content (e.g., critical, real-time, best effort, low/medium/high quality for hierarchically encoded content, content representation, content format (e.g., MP3, MP4, text, rich text, portable data format (PDF), or the like).

One or more of the platform attributes, content attributes, and/or network attributes to be used in making a routing decision, such as by the routing circuitry 504. One or more of the platform attributes, content attributes, and/or network attributes can be selected by a user or device that issues the interest packet 508 or the content packet 510. Such attribute selection can be provided to the router 502A in an attribute selection field 602 and/or 702 of the packet 508 or 510.

FIG. 6 illustrates, by way of example, a logical diagram of an embodiment of an extended interest packet 508A. The extended interest packet 508A includes an attribute selection field 602. The attribute selection field 602 includes a series of bits indicating whether a specific attribute is to be used in a routing decision. In the example illustrated in FIG. 6, the available bandwidth is to be used by the router 502A in making the routing decision, while the link latency, memory usage, transmission cost, location, and power consumption are not to be considered in making the routing decision.

In one or more embodiments, the attribute selection field 602 is an optional block that can be incorporated in an interest packet or a content packet. The attributes identified in the attribute selection field 602 of the interest packet can be likewise be identified in an attribute selection field 702 of a content packet 510A that is provided in response to the interest packet 508A. The selected attribute(s) can form a basis for routing guidelines, such as to select a path based on the attributes identified in the attribute selection field 602 (e.g., "select path with lowest CPU load, "select path with best available storage (if caching is enabled)", "select content with quality level between Q1 and Q2", or the like).

One or more of the platform attributes, content attributes, and/or network attributes can be provided to the router 502 in the interest packet 508 or the content packet 510. FIG. 7 illustrates, by way of example, a logical diagram of an embodiment of an extended content packet 510A. The extended content packet 510A includes an attribute field 704 and an attribute selection field 702. The attribute selection field 702 is similar to the attribute selection field 602. The attribute field 704 as illustrated includes a variety of attributes for each of a variety of nodes. The attribute field 704 can include attributes of nodes through which the data packet 510A has been routed or nodes for which the attribute information is otherwise available. For example, attribute information for the router C 502C may be available at the router 502B, such as by the router C 502C communicating the attribute information either directly or indirectly to the router 502B. Similarly, attribute information for other, non-router nodes can be made available.

The attribute information provided by the data packet 510A, as illustrated, includes a link latency for uplink (UL), a quality of service (QoS) provided by the node, jitter, bandwidth, error rate, power consumption, link latency on downlink (DL), and duty cycle for two nodes, node 1 and node 2. While the attributes provided for each of the nodes (node 1 and node 2) includes the same attributes, information for different attributes can be provided for different nodes. The routing circuitry 504 can issue a write request to the memory 506, such as to record attributes from a packet 508 or 510, such as in the FIB 516, the content 518, or other location of the memory 506.

FIG. 8 illustrates, by way of example, a logical diagram of an embodiment of another extended interest packet 508B. The extended interest packet 508B as illustrated includes an attribute field 802. The attribute field 802 can carry one or more attribute values for one or more for one or more attributes. Each attribute can include an attribute identification that identifies the attribute to which the attribute value corresponds, a corresponding entity, device, or content identification that identifies a user, device, or content to which the attribute is associated.

The attribute field 802 of the interest packet 508B as illustrated includes an attribute identification sub-field 804, an attribute value sub-field 806, and an entity/device/content identification 808. Each attribute provided in the attribute field thus is identified with a specific attribute through the attribute identification 804. The attribute value 806 is associated with the attribute identified by the attribute identification 804. The entity/device/content identification 808 is used to bind the attribute value 806 and associated attribute identification 804 with a specific user, device (e.g., a node, such as a router), or content.

FIG. 9 illustrates, by way of example, a logical diagram of an embodiment of another extended content packet 510B. The extended content packet 510B as illustrated includes an attribute field 904. The attribute field 904 as illustrated includes content attributes. The content attributes include attributes for multiple items of content, first content associated with a first content identification 906A and second content associated with a second content identification 906B. The content identification 906A-B may or may not be associated with the data 408 of the content packet 510B. The content identification 906A-B can be associated with content that includes a popularity above a specified threshold or other attribute that meets specified criteria. The attributes provided in the attribute field 904 can be stored in the memory 506. By including attributes for popular content in the router 502A, the content that is requested more often (in an interest packet) be routed more intelligently.

Figures 10, 11:
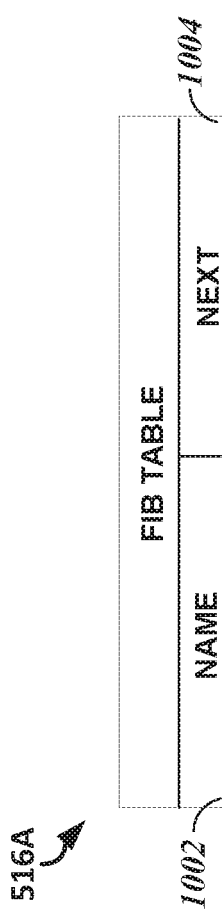
FIG. 10 illustrates, by way of example, a logical diagram of an embodiment of a FIB.
FIG. 11 illustrates, by way of example, a logical diagram of an embodiment of an extended FIB.

FIG. 10 illustrates, by way of example, a logical diagram of an embodiment of A FIB 516A. The FIB 516A details content names in a name field 1002 and a next destination for the content associated with the name 1002 in a next field 1004. FIG. 11 illustrates, by way of example, a logical diagram of an embodiment of an extended FIB 516B. The extended FIB 516B details the name of the content in the name field 1002, optionally details a next destination in the next field 1004, and a plurality of attributes 1006A, 100613, 1006C, 1006D, and 1006E. The next field 1004 is optional because the routing circuitry 504 can determine the next destination without storing the next destination in the FIB 516. The attributes 1006A-E can be associated with the content named in the name field 1002 and/or the device named in the next field 1004. The illustrated attributes 1006A-E regard platform attributes (they are associated with the device named in the next field 1004).

A problem with an ICN overlaying a wireless network is that wireless networks often have low power, low cost requirements, and their applications may have different requirements on data to be transmitted on the uplink (UL) and downlink (DL). Often the requirements are such that their links are asymmetric. This means that when transmitting data, the routing path(s) or even the radio technology used to send the data UL may be different from the path(s) used to receive the downlink data. Here "uplink" is defined with respect to the wireless node that generates data and sends it to the wireless router. However, ICN networks are currently not aware of this asymmetry between UL and DL. Thus, it can be beneficial to consider the path direction with respect to the wireless node (e.g., DL vs UL) in determining how to route the packet. Routers in the routing path can take this into consideration when sending a get message or when the nodes need to upload their data to the gateway. This is something that can be deduced from whether it's a get request (e.g., an interest packet) or a message to publish the data, can depend on how the network is structured. Various other attributes of the link, such as the radio layer technology type, transmit power capabilities, sleep/wake duty cycle etc. can be considered when determining the routing path.

As illustrated, the FIB 516B includes separate attributes for device uplink (UL) and device downlink (DL) paths. The UL and DL paths can be different and/or otherwise have different attributes. Examples of symmetrical and asymmetrical DL and UL paths are provided in FIG. 12.

Another aspect of ICN over wireless networks is that the content may come from a variety of different sensors. That is, the contents of the data may come from several "sources" instead of a single source. The source information can be clarified, such as by using an author(s) attribute. The author(s) attribute can identify the source(s) of the data. In this manner, the attribute can be clarified within the ICN layer so that it is understood that the sources include different nodes and which specific ones contributed to the published data.

Depending on the capability of the sensor nodes and devices, the "source" of the content (e.g., the sensor nodes) may not be the ones which actually publish the data. Instead the publisher may be another device within the network that receives the data and publishes the data. The device can also alter the data, such as by processing the data in some way, such as if the device is a server. Thus, an interest packet from a device may translate to a plurality of get messages from the wireless gateway network to sensor nodes within its network, such as for better scalability. In this case, the ICN network may keep track of which sensor nodes contributed to what content. This can be done by storing attributes of the content such as the type, the number, and the identifiers of the nodes that contributed to the content, such as in publishing or gathering data of the content.

Figure 12:
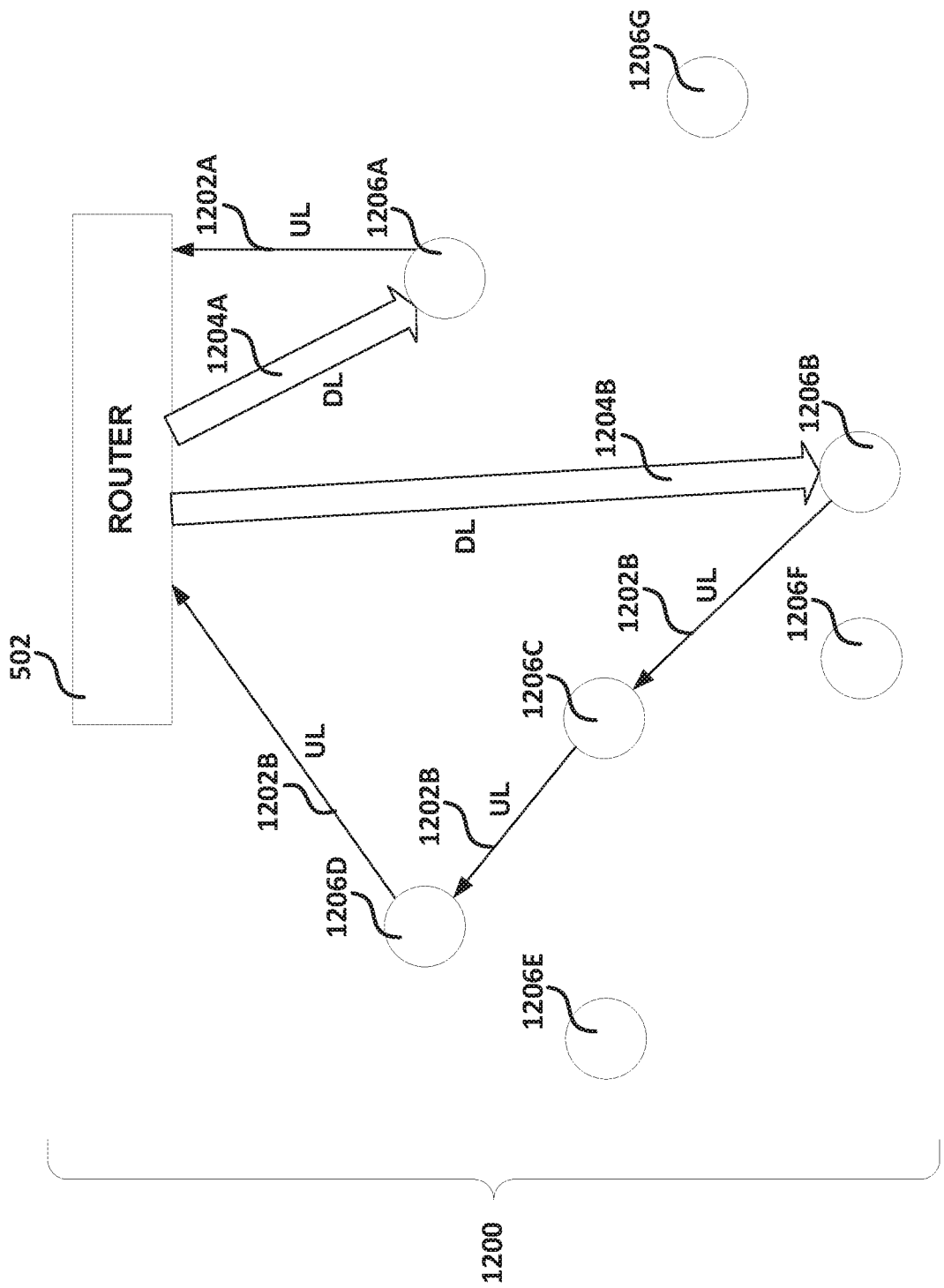
FIG. 12 illustrates, by way of example, a logical block diagram of an embodiment of a system.

FIG. 12 illustrates, by way of example, a logical block diagram of an embodiment of a system 1200. The system 1200 as illustrated includes the router 502 communicatively coupled to a plurality of nodes 1206A, 1206B, 1206C, 1206D, 1206E, 1206F, and 1206G. A UL path 1202A and DL path 1204A are illustrated for the node 1206A. The UL path 1202A and the DL path 1204A are symmetrical. That is, the path for the node 1206A to upload data to the router 502 is the same as the path for the node 1206A to download data from the router 502. In contrast, the DL path 1204B and the UL path 1202B for the node 1206B are asymmetrical. The asymmetrical paths can be due to power restrictions at the node 1206B. The router 502 can have enough power to provide data to the node 1206B, but the node 1206B may not have enough power to provide data to the router 502. Thus, the node 1206B provides data to the node 1206C, which forwards the data to the node 1206D, which forwards the data to the router 502, thus completing the UL path 1202B. The asymmetrical paths and/or power availability differences between devices of the network may cause a UL path 1202 to have different attributes than a DL path 1204. This difference can be reflected in the FIB 516, content packet 510, or interest packet 508 an example of which is shown in the FIB 516B of FIG. 11.

Figure 13:
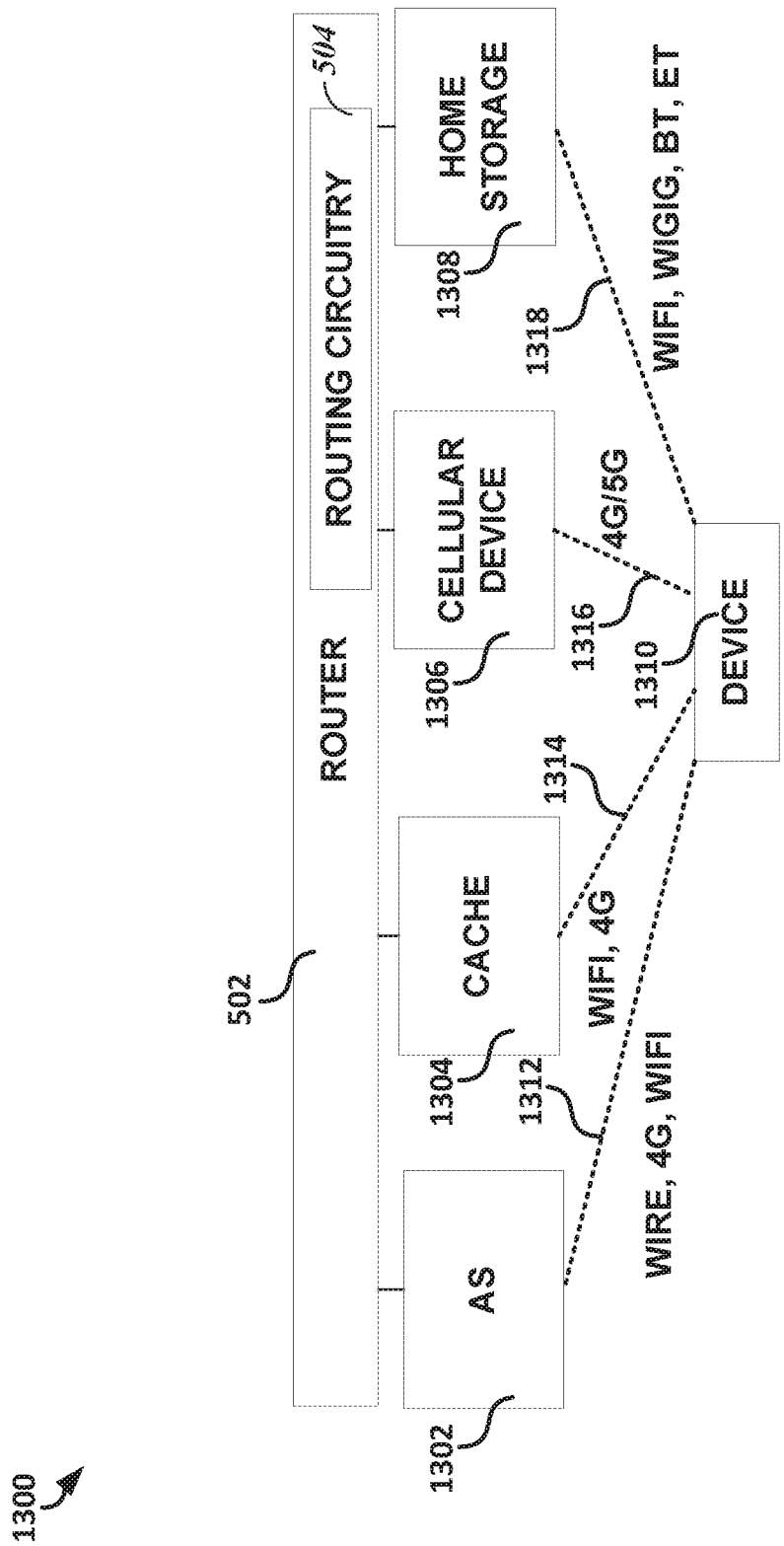
FIG. 13 illustrates, by way of example, a logical block diagram of an embodiment of a system that includes an ICN router.

FIG. 13 illustrates, by way of example, a logical block diagram of an embodiment of a system 1300 that includes an ICN router 502. The system 1300 as illustrated includes a plurality of nodes. The nodes as illustrated include an application server 1302, a cache 1304, a cellular device 1306, and a home storage 1308. Each of the nodes are communicatively coupled to the device 1310. The device 1310 is the node that issued an interest packet, and the router 502, using the routing circuitry 504, is to determine a node through which a content packet is to be provided to the device 1310. The node through which the content packet is to be routed can be determined based on attributes in an extended content packet, extended interest packet, extended FIB, the memory 506, or the like.

The routing path can be determined based on an attribute selection field in the interest packet or the content packet. For example, consider an attribute selection field of the content packet indicates that the packet is to be routed based on the amount of time it takes for the packet to travel to the device 1310. In such an example, the router 502 can provide the packet to the device 1310 through the home storage device 1308, such as over Ethernet. In another example, consider an attribute selection field that indicates a wireless connection with low error rate is to be used to route the content packet. The router 502 can determine, by looking up attributes in the extended FIB, extended content packet, extended interest packet, the memory 506, or by querying a policy server (see FIGS. 14 and 16) which wireless connection of the available wireless connections (e.g., 4G, 5G, WiFi, Bluetooth, Wigig, or the like) has the lowest error rate and forward the packet along that path.

In one or more embodiments, attribute data may not be currently available. In such embodiments, the routing circuitry 504 can: (1) assume that the attributes are default attributes, such as can include an average, maximum, or minimum of attributes of like devices or content, or a default specified by an administrator or other user, (2) route as indicated by the next field 1004 in the FIB 516 and without consideration for attributes (as in legacy ICN), or (3) other routing technique. Default values can be specified for different connections, such as to have different default values for a 4G connection, 5G connection, WiFi, Ethernet, etc. Default values can be specified for different content types, such as to have different default values for audio content, video content, and/or textual content. The default values can be specified based on an application that can be used to access the content, such as to have different default values for a text file, pdf file, Microsoft Word file, etc.

Content attributes, for example, can be used to optimize information delivery to a user. For example, consider a user that requests streaming content, but does not specify a format for the streaming content. A default rule or policy can provide the streaming content in a format that does not cause a stall, re-buffering, or other pause in the playback (e.g., in a dynamic adaptive streaming over hypertext transfer protocol (DASH) video streaming format, sometimes referred to as moving picture experts group (MPEG-DASH)). In one or more embodiments, video, audio, visual, or other content can be encoded, stored, and/or served at different quality levels called representations. The different content representations may be available on a single server or cache, or they may be available from different caches in a distributed manner. The content can then be routed and provided to a requesting user depending on the size of the content and the potential to route a higher quality version (more data) of the content. If sufficient bandwidth is available, a higher quality version of the content can be provided.

In one or more embodiments, different content may be routed over different connectivity. For example, one connection (e.g., 4G, 5G, WiFi, Ethernet, USB, Bluetooth, etc.) may be more efficient to use for delay sensitive traffic, such as streaming data, another may be better for high data volume (e.g., a streaming application or a download of a movie), and another for loss sensitive data (e.g., credit card information, social security numbers, or the like).

Figure 15:
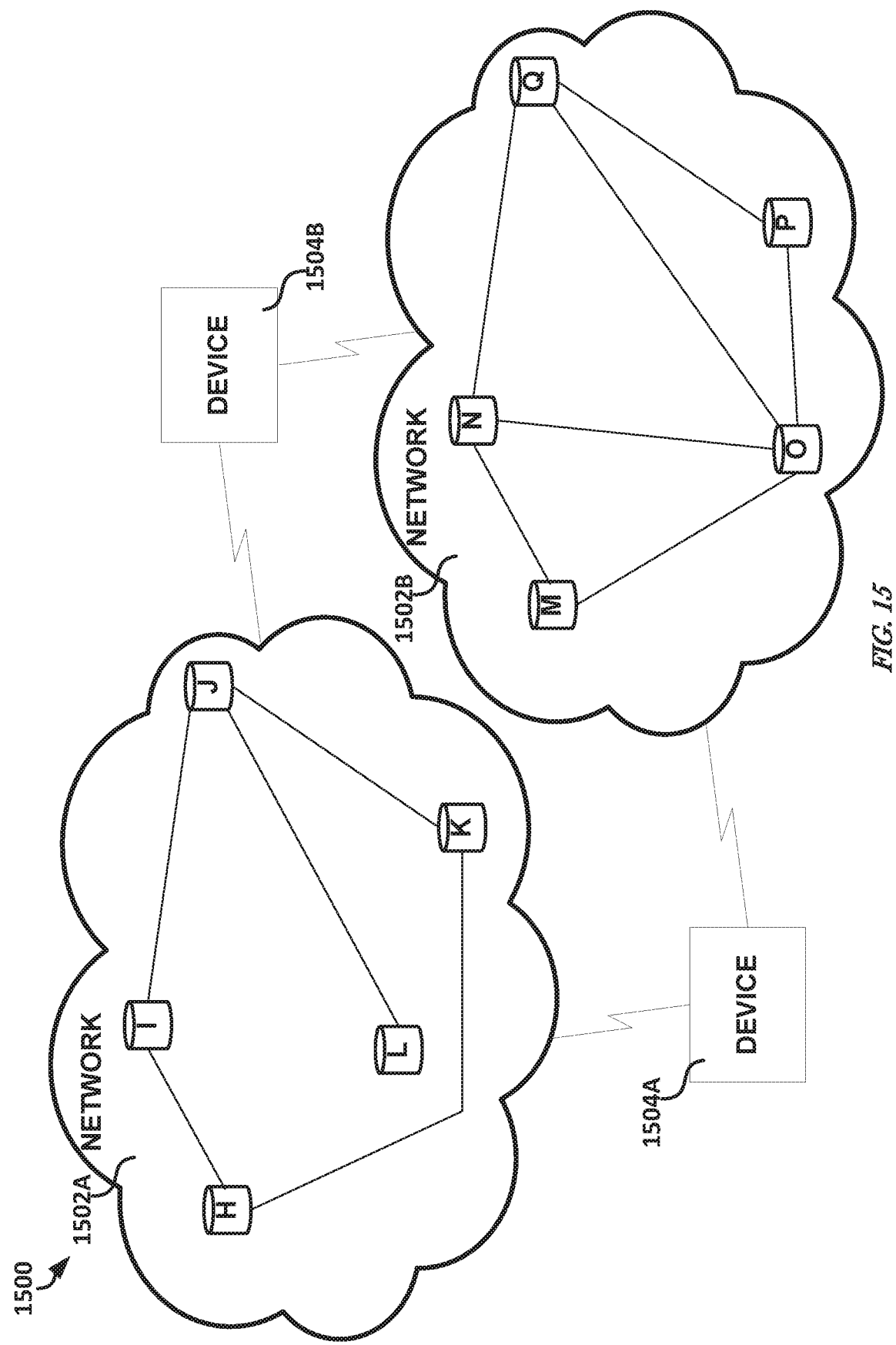
FIG. 15 illustrates, by way of example, a logical block diagram of an embodiment of a system with inter-network routing.

In one or more embodiments, the router 502 may route data strictly within a network or may choose to route data between networks. The attributes of the nodes on the networks and attributes associated with passing data through the network boundary can be considered in determining whether to route data to another network. FIG. 14 illustrates, by way of example, a logical block diagram of an embodiment of a system 1400 with strictly intra-network routing. Each of the database symbols labelled with a letter each represent a router, such as can be similar to the router 502A. The router(s) can forward an interest packet or content packet to another router. FIG. 15 illustrates, by way of example, a logical block diagram of an embodiment of a system 1500 with inter-network routing. Similar to the system 1400, the database symbols labelled with a letter each represent a router, such as can be similar to the router 502A, that can forward an interest packet or content packet to another router. The system 1500 includes a device 1504 that can provide packets from the network 1502A to the network 1502B and vice versa. In determining whether to route a packet to another network, one or more of the attributes of the device(s) through which the data must be transferred to get to the network can be considered by the router.

For example, data residing on the network 1502A can be requested by a user of the network 1502B, such as by using a device to issue an interest packet. To retrieve the data a router can determine which path of (1) a path including the device 1504A and (2) a path including the device 1504B is to be used to route the interest packet. Attributes of the device 1504A-B can be provided to the routers of the network 1502A-B, such as by using lower layer signaling, such as a communication from the device 1504A-B over a lower layer of the network 1502A-B. The attributes can be provided to the routers and/or stored in a FIB or other memory location of the routers. The attributes can then be used by the routing circuitry 504 in determining which of the devices 1504A-B through which to route the interest packet.

Similarly, a router of the network 1502A can use the same or different attributes of the devices 1502A-B in determining a routing path on which to return a corresponding content packet.

To transfer information across layers of the ICN an interface (e.g., an application programming interface (API)) can be defined and implemented between layers. The lower network layer can indicate to a higher network layer whether the router has more than one physical connectivity, the type of connectivity, attributes of the connectivity, or the like. The attributes can be distributed to routers, such as by publishing (e.g., in one or more centralized or distributed memories that can be accessed by the routers, a FIB, or the like), broadcasting to routers capable of wireless communication, or flooding the network with the attributes (e.g., broadcasting the attributes to nodes within range). Such attributes can enable application level extensions (e.g., device capability, location information, or the like).

Many users access content from mobile devices in a wide variety of locations. At a large scale, content requested by a device may reside in a different country than a current location of the user. At a smaller scale, the device may be located across a city from the location of the content. A physical distance between the requesting device and the content can become an important attribute for routing decisions for ICN, such as when the process(es) depending on the data are time-sensitive. Thus, the location of the device can be determined by lower or higher layer processing and provided to the content layer so that the device location can be included as an attribute in the packet (e.g., interest or content packet).

If there is no location information used in the routing decision, the ICN routing circuitry may choose a content source that is physically far away from the user, when there may be a content source physically closer to the user. Current ICN routers do not consider the location of the requesting device in satisfying an interest packet.

Figure 16:
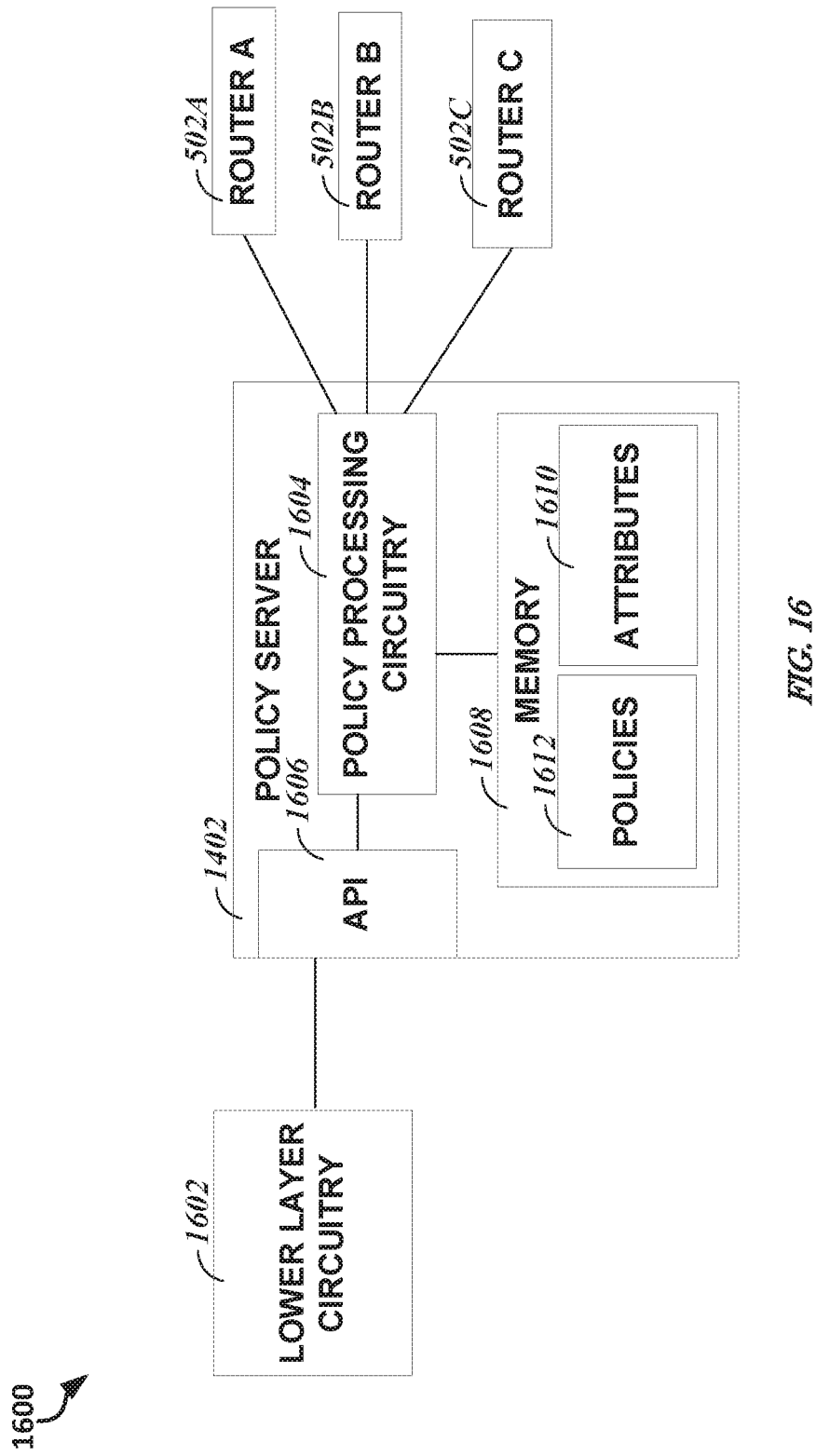
FIG. 16 illustrates, by way of example, a logical block diagram of an embodiment of a portion of an ICN system.

FIG. 16 illustrates, by way of example, a logical block diagram of an embodiment of a portion of an ICN system 1600. The system 1600 as illustrated includes lower layer circuitry 1602, a policy server 1402, and a plurality of routers 502A-C. The API 1606 and lower layer layer circuitry 1602 of FIG. 5 can be similar to the same components shown in FIG. 16. The lower layer circuitry 1602 includes circuitry to implement one or more of the layers 202, 204, and 206. The lower layer circuitry 1602, in one or more embodiments, can include electric or electronic components, such as can include components similar to that discussed with regard to the routing circuitry 504. The lower layer circuitry 1602 can monitor performance of packet transit in the content layer 208. The performance can be recorded as one or more attributes that can be provided to the router 502 and/or the policy server 1402. The attributes can include a QoS, a link latency, a type of connectivity interface available at the router, different attributes for UL and DL using the interface, or other network attributes as discussed herein. Device attributes, such as a location of the device that issued an interest packet, can be determined at a first layer 202 and provided to the content layer 208, such as by communicating the location through the lower layers.

The policy server 1402 as illustrated includes policy processing circuitry 1604, an application programming interface (API) 1606, and a memory 1608. The policy processing circuitry 1604 can include electric or electronic components (similar to the routing circuitry 504). The policy processing circuitry 1604 can be configured to receive a packet from one of the routers 502A-C or the API 1606. The packet can include an interest packet that includes a content name field that names a policy. The policy named can be one of a plurality of policies 1612 in the memory. 1608. The policies 1612 can each be named using a same convention as is used to name content that is published by a publisher in the ICN. In such an embodiment, a policy can be retrieved, by the policy processing circuitry 1604, using an interest packet in a manner similar to that used in retrieving content.

The policy processing circuitry 1604 can record updates to policies 1612 and/or attributes 1610, such as can be provided by the lower layer circuitry 1602 through API 1606 or by the router 502A-C. The policy processing circuitry 1604 can perform analytics on performance of the policies. The analytics can determine which policies lead to lower time latency between interest packet issuance and fulfillment, higher QoS, successful delivery of content with error below a specified threshold, or the like.

The policy processing circuitry 1604 can, in one or more embodiments, periodically poll the lower layer circuitry 1602 for attribute information that can be used in the analytics, stored in the attributes 1610, and/or forwarded to the router(s) 502A-C, such as to be used in determining a next node to which to forward a packet. The policy processing circuitry 1604 can, in one or more embodiments, poll the lower layer circuitry 1602 in response to occurrence of one or more specified events. The events can include a specified number of policies requested, a specified time elapsing since a last attribute request, a router query including a request for data not available at the policy server 1402, or other event. The policy processing circuitry 1604 can provide one or more policies to a router or other nodes.

The API 1606 provides an interface through which the lower layer circuitry 1602 can communicate with the policy server 1402 and vice versa. The API 1606 provides a layer of abstraction such that the policy server 1402 does not need to know what format data provided to the lower layer circuitry 1602 needs to conform to and vice versa.

A policy can be: (A) Known/static to all routers (e.g., standardized), (B) Semistatic/semidynamic (e.g., available through a policy server 1402), (C) Dynamic (goes with the data). A policy defines which attributes are used in making a routing decision and how they are used in the overall routing decision, such as to accommodate the requesting device's desire as well as the network capabilities. The policy can include rules that define how a router is to determine which node is to receive a packet from the router.

The routing circuitry 504 can issue a query to the policy server 1402, such as to retrieve one or more policies therefrom. The policy governing the routing decision is not only determined by content specifics, but also on the attributes of devices to which the packet may be routed as well as one or more attributes of the endpoint requesting the content. For example, lower layer radio level information (e.g., link quality, air interface type, availability of multiple interfaces, etc.) as well as requesting devices capabilities that might impact route selection, as attributes to be used in routing decisions. Hence, before the ICN router forwards the packet of interest to the next node, the router can query the policy server 1402 to retrieve one or more policies governing the requested content as well as route specific forwarding policies. For example, a policy for delay or reliability sensitive content can indicate that the routing policy considers multicast of the packet wherever possible. In one or more embodiments, a policy can include a sort of greedy algorithm that includes combing all attributes and selecting a route using ranking.

Current ICNs rely on hop-by-hop (neighbor-to-neighbor) routing. Hop-by-hop routing means that each router determines the next router or destination to which the packet is provided. In principle, the ICN router needs to only query the policy server for attributes of the possible next nodes and/or a policy governing the routing of the current packet in its forwarding decision. It may be possible, that the ICN framework relies on an end-to-end routing protocol in future implementation. In such implementations it could be possible to dynamically determine nearest neighbors of the router based on different link quality attributes, possibly in advance of the content specific forwarding decision, and the routing decision can be provided in an interest packet or content packet.

Additional mechanism to propagate policies around the route are also needed. One simple mechanism to improve the efficiency (reduce delay) of the policy query is for policy server to multicast the policy information to not only the requesting router but also to its nearest neighbors. The nearest neighbor information may be included in the policy query by the initial requester. The "network neighborhood" may be defined (for e.g., a subnet) and reported for such use.

The policy may be treated as a named object and be queried via ICN mechanisms (publish/subscribe) by different nodes, such as in the same manner as content. The policy can include a "time-to-live" attribute, which allows for deletion or refresh, after the time-to-live has lapsed. A policy can be hierarchical, such that there could be a policy definition for combinations of policies or policies may be combined based on a definition provided in a metapolicy object.

The use of a policy server, as opposed to publishing the policies to each of the routers, can simplify the number and types of attributes to be used for (routing) decision making via a prioritization mechanism, thus allowing for a more easily scalable solution (as compared to publishing the policies to each of the routers). For example, distributed policy servers (or other policy servers) exchange attributes, as well as information regarding the effect of the policies. The servers can perform analytics on the effects of the policies and can develop simplified composite policies, prioritize the most important attributes, or otherwise alter policies based on the analytics.

Figure 17:
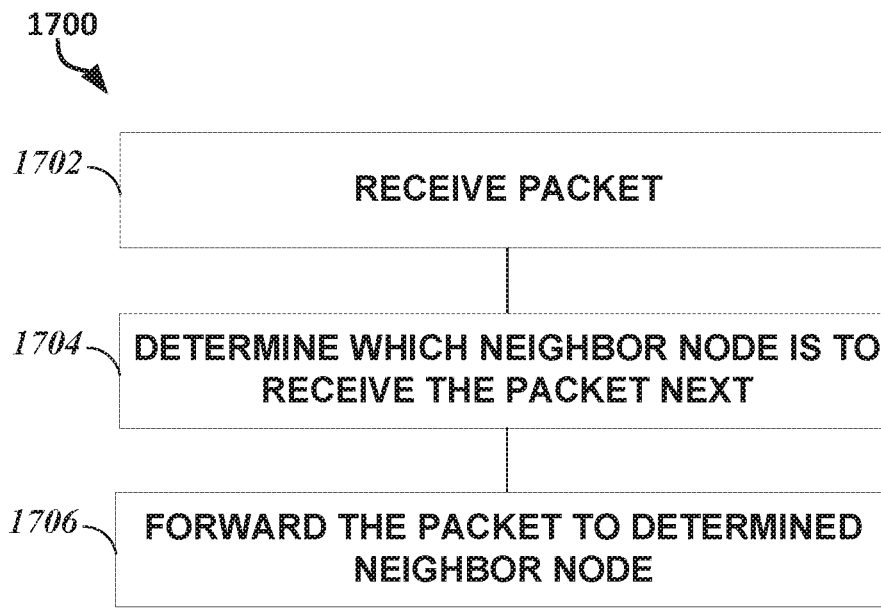
FIG. 17 illustrates, by way of example, a diagram of an embodiment of a method for routing a packet in an ICN.

FIG. 17 illustrates, by way of example, a diagram of an embodiment of a method 1700 for routing a packet in an ICN. The method 1700 can be performed by the routing circuitry 504. The method 1700 as illustrated includes receiving a packet, at operation 1702; determining which neighbor node is to receive the packet next, at operation 1704; and forwarding the packet to the determined neighbor node, at operation 1706. The packet received at operation 1702 can include a content packet, such as can be an extended content packet, or an interest packet, such as can be an extended interest packet. The packet can include one or more attributes, such as can include at least one of a network attribute, a platform attribute, and a content attribute. The operation 1704 can be performed based on attributes in the received packet.

The operation 1702 can include reading the one or more attributes from an extended forwarding information base table in a memory of the router. The operation 1702 can include reading the one or more attributes from the received packet. The operation 1702 can include issuing a query to a policy server to retrieve the one or more attributes from the policy server. The operation 1702 can include reading the one or more attributes from an attribute field of an extended interest packet. The operation 1702 can include reading the one or more attributes from an attribute field of an extended content packet.

In one or more embodiments, the packet can include an attribute selection field, wherein the attribute selection field includes data indicating one or more attributes to be used in performing the operation 1704. The operation 1702 can include one or more of: (1) issuing a query to a policy server to retrieve the one or more attributes indicated in the attribute selection field from the policy server, (2) reading the one or more attributes indicated in the attribute selection field from an extended forwarding information base (FIB) table in the storage device, and (3) reading the one or more attributes indicated in the attribute selection field from the received packet.

The attributes can include identification of one or more connectivity interfaces of the neighbor nodes and one or more attributes of each of the connectivity interfaces. The attributes of each of the connectivity interfaces include an average link latency and a quality of service available over each of the connectivity interfaces. A first connectivity interface of the connectivity interfaces includes a wired connection and a second connectivity interface of the connectivity interfaces includes a wireless connection. The connectivity interfaces, average link latency, and quality of service are provided by a lower layer of the network relative to the layer on which the ICN router resides. The attributes can include a link latency for an uplink and a link latency for a downlink for each neighbor node. The attributes can include a location of a device that issued the packet.

The packet can include an attribute field including an attribute identifier that indicates an attribute type, an attribute value associated with the attribute type, and a device identifier that indicates a device with which the attribute is associated. The method 1700 can further include updating a forwarding information base (FIB) to include the attribute value.

Figure 18:
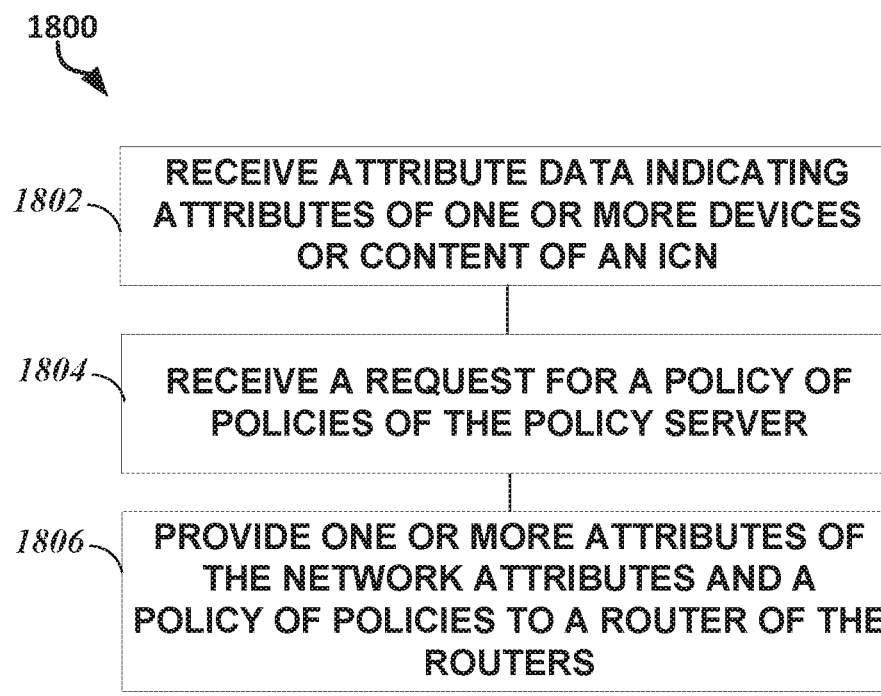
FIG. 18 illustrates, by way of example, a diagram of an embodiment of a method of providing a policy to a router of an ICN.

FIG. 18 illustrates, by way of example, a diagram of an embodiment of a method 1800 of providing a policy to a router of an ICN. The method 1800 can be performed by one or more components of the policy server 1402. The method 1800 as illustrated includes receiving attribute data indicating attributes of one or more devices or content of an ICN, at operation 1802; receiving a request for a policy of policies of the policy server, at operation 1804; and providing one or more attributes of the network attributes and a policy of policies to the router, at operation 1806. The operation 1802 can be performed by an API of the policy server and the attribute data can be received from lower layer circuitry. The attributes can include one or more network, platform, and/or content attributes. In one or more embodiments, the network attributes can include link latency and a type of connectivity of a plurality of connectivity interfaces of the routers. The operation 1806 can be performed by the policy processing circuitry 1604.

The method 1800 can further include issuing, by the API and to the lower layer circuitry, a request for updated attribute data. Issuing the request for the updated attribute data can include periodically issuing, at fixed time intervals, the request for the updated attribute data. The method 1800 can further include performing analytics on data provided by at least one of the lower layer circuitry and the routers to determine which policies provide a time between issuance of an interest packet and fulfillment of the interest packet below a specified threshold. The method 1800 can further include modifying, based on the analytics, a policy of the policies to reduce a time between issuance of the interest packet and fulfillment of the interest packet.

The operation 1806 can include providing the policy further based on data in an attribute selection field of an extended interest packet or an extended content packet. The method 1800 can further include receiving, by a router of the routers, a request for a policy of the policies. The method 1800 can further include providing, in response to receiving the request, providing the policy to the router and one or more neighbor routers of the router.

Figure 19:
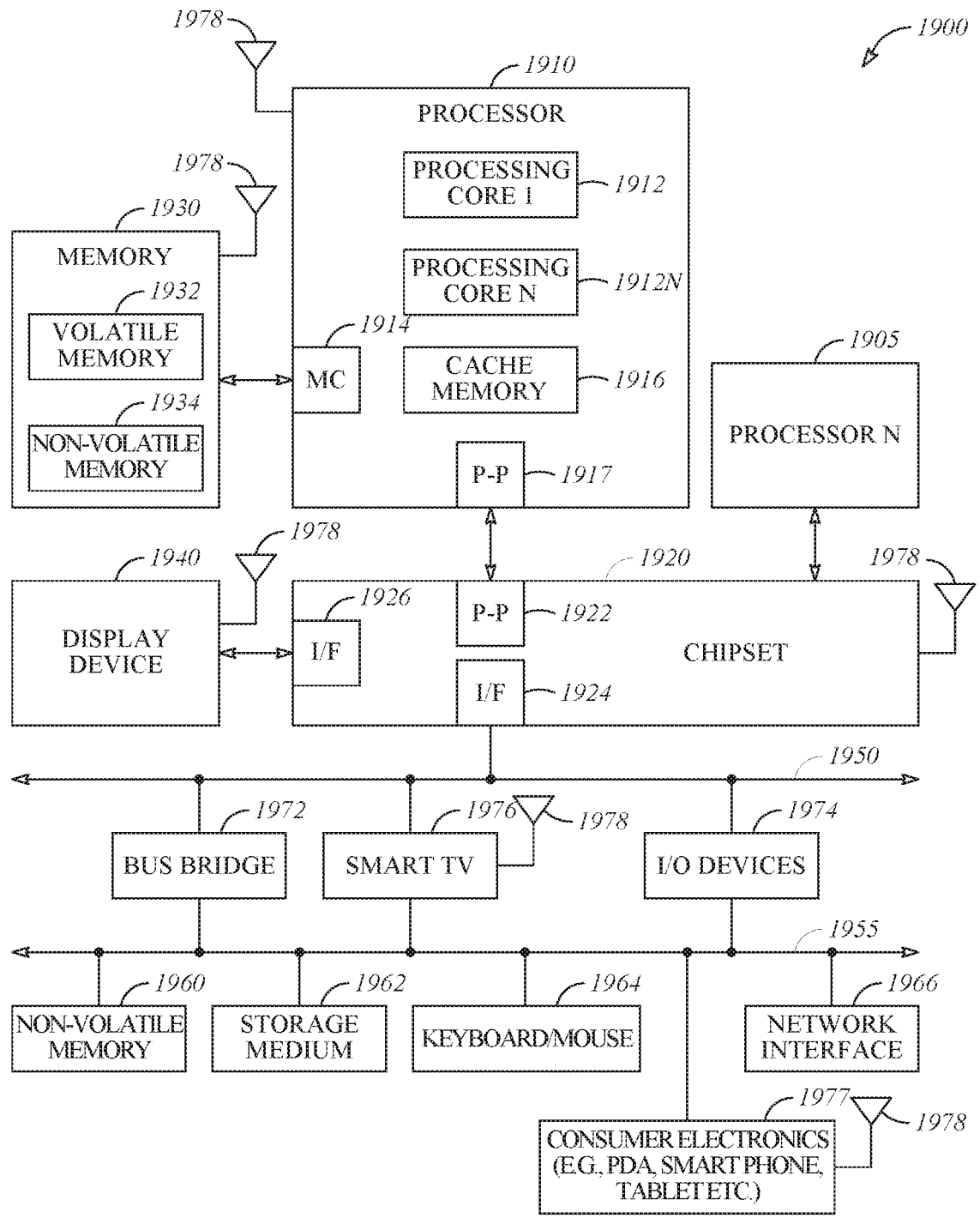
FIG. 19 illustrates, by way of example, a logical block diagram of an embodiment of a system.

FIG. 19 illustrates, by way of example, a logical block diagram of an embodiment of a system 1900. In one or more embodiments, the system 1900 includes one or more components that can be included in the router 502, application server 1302, the device 1310, policy server 1402, lower layer circuitry 1602, or a component thereof, such as the routing circuitry 504, the policy processing circuitry 1604, or other component illustrated in the FIGS.

In one embodiment, processor 1910 has one or more processing cores 1912 and 1912N, where 1912N represents the Nth processing core inside processor 1910 where N is a positive integer. In one embodiment, system 1900 includes multiple processors including 1910 and 1905, where processor 1905 has logic similar or identical to the logic of processor 1910. In some embodiments, processing core 1912 includes, but is not limited to, pre-fetch logic to fetch instructions, decode logic to decode the instructions, execution logic to execute instructions and the like. In some embodiments, processor 1910 has a cache memory 1916 to cache instructions and/or data for system 1900. Cache memory 1916 may be organized into a hierarchal structure including one or more levels of cache memory.

In some embodiments, processor 1910 includes a memory controller 1914, which is operable to perform functions that enable the processor 1910 to access and communicate with memory 1930 that includes a volatile memory 1932 and/or a non-volatile memory 1934. In some embodiments, processor 1910 is coupled with memory 1930 and chipset 1920. Processor 1910 may also be coupled to a wireless antenna 1978 to communicate with any device configured to transmit and/or receive wireless signals. In one embodiment, the wireless antenna interface 1978 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 1932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 934 includes, but is not limited to, flash memory, phase change memory (PCM), read-only memory (ROM), electrically erasable programmable read-only memory (EEPROM), or any other type of non-volatile memory device.

Memory 1930 stores information and instructions to be executed by processor 1910. In one embodiment, memory 1930 may also store temporary variables or other intermediate information while processor 1910 is executing instructions. The memory 1930 is an example of a machine-readable medium. While a machine-readable medium may include a single medium, the term "machine-readable medium" may include a single medium or multiple media (e.g., a centralized or distributed database, and/or associated caches and servers).

The term "machine-readable medium" may include any medium that is capable of storing (e.g., a machine-readable storage device), encoding, or carrying instructions for execution by a machine (e.g., the routing circuitry 504, the policy processing circuitry 1604, or any other device) and that cause the machine to perform any one or more of the techniques of the present disclosure, or that is capable of storing, encoding or carrying data structures used by or associated with such instructions. In other words, the various circuitry discussed herein can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In the illustrated embodiment, chipset 1920 connects with processor 1910 via Point-to-Point (PtP or P-P) interfaces 1917 and 1922. Chipset 1920 enables processor 1910 to connect to other elements in system 1900. In some embodiments of the invention, interfaces 1917 and 1922 operate in accordance with a PtP communication protocol such as the Intel® QuickPath Interconnect (QPI) or the like. In other embodiments, a different interconnect may be used.

In some embodiments, chipset 1920 is operable to communicate with processor 1910, 1905N, display device 1940, and other devices. Chipset 1920 may also be coupled to a wireless antenna 1978 to communicate with any device configured to transmit and/or receive wireless signals.

Chipset 1920 connects to display device 1940 via interface 1926. Display device 1940 may be, for example, a liquid crystal display (LCD), a plasma display, cathode ray tube (CRT) display, or any other form of visual display device. In some embodiments of the invention, processor 1910 and chipset 1920 are merged into a single SOC. In addition, chipset 1920 connects to one or more buses 1950 and 1955 that interconnect various elements 1974, 1960, 1962, 1964, and 1966. Buses 1950 and 1955 may be interconnected together via a bus bridge 1972. In one embodiment, chipset 1920 couples with a non-volatile memory 1960, a mass storage device(s) 1962, a keyboard/mouse 1964, and a network interface 1966 via interface 1924 and/or 1904, etc.

In one embodiment, mass storage device 1962 includes, but is not limited to, a solid state drive, a hard disk drive, a universal serial bus flash memory drive, or any other form of computer data storage medium. In one embodiment, network interface 1966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the components shown in FIG. 19 are depicted as separate blocks within the system 1900, the functions performed by some of these blocks may be integrated within a single semiconductor circuit or may be implemented using two or more separate integrated circuits. For example, although cache memory 1916 is depicted as a separate block within processor 1910, cache memory 1916 (or selected aspects of 1916) can be incorporated into processor core 1912.

EXAMPLES AND NOTES

The present subject matter may be described by way of several examples.

Example 1 can include an information centric network (ICN) router comprising a memory, and routing circuitry coupled to the memory, the routing circuitry configured to receive a packet, receive one or more attributes including at least one of (1) a network attribute, (2) a platform attribute, and (3) a content attribute, determine which neighbor node is to receive the packet next based on the received one or more attributes, and forward the packet to the determined neighbor node In Example 2, Example 1 can further include, wherein the routing circuitry configured to receive the one or more attributes includes the routing circuitry configured to read the one or more attributes from an extended forwarding information base table in the memory.

In Example 3, at least one of Examples 1-2 can further include, wherein the routing circuitry configured to receive the one or more attributes includes the routing circuitry configured to read the one or more attributes from the received packet.

In Example 4, at least one of Examples 1-3 can further include, wherein the routing circuitry configured to receive the one or more attributes includes the routing circuitry configured to issue a query to a policy server to retrieve the one or more attributes from the policy server.

In Example 5, at least one of Examples 1-4 can further include, wherein the packet is an extended interest packet and wherein the routing circuitry configured to receive the one or more attributes includes the routing circuitry configured to read the one or more attributes from an attribute field of the extended interest packet.

In Example 6, at least one of Examples 1-5 can further include, wherein the packet is an extended content packet and wherein the routing circuitry configured to receive the one or more attributes includes the routing circuitry configured to read the one or more attributes from an attribute field of the extended content packet.

In Example 7, at least one of Examples 1-6 can further include, wherein the packet is an extended interest packet or an extended content packet, wherein the packet includes an attribute selection field, wherein the attribute selection field includes data indicating one or more attributes to be used by the routing circuitry in the determination of which neighbor node is to receive the packet next.

In Example 8, Example 7 can further include, wherein the routing circuitry configured to receive the one or more attributes includes one or more of: (1) the routing circuitry configured to issue a query to a policy server to retrieve the one or more attributes from the policy server, (2) the routing circuitry configured to read the one or more attributes from an extended forwarding information base table in the memory, and (3) the routing circuitry configured to read the one or more attributes from the received packet.

In Example 9, at least one of Examples 1-8 can further include, wherein the attributes include connectivity interfaces of nodes within an ICN to which the router is connected and one or more attributes of each of the connectivity interfaces.

In Example 10, Example 9 can further include, wherein the attributes of each of the connectivity interfaces include at least two of (1) an average link latency, (2) a maximum link latency, (3) a quality of service, (4) jitter, (5) capacity, and (6) bandwidth available over each of the connectivity interfaces.

In Example 11, Example 10 can further include, wherein a first connectivity interface of the connectivity interfaces includes a wired connection and a second connectivity interface of the connectivity interfaces includes a wireless connection.

In Example 12, at least one of Examples 10-11 can further include, wherein the connectivity interfaces, average link latency, and quality of service are provided by a lower layer of the network relative to the layer on which the ICN router resides.

In Example 13, at least one of Examples 10-12 can further include, wherein the attributes include a link latency for an uplink and a link latency for a downlink for each neighbor node.

In Example 14, at least one of Examples 1-13 can further include, wherein the packet is an extended interest packet, and wherein the attributes include a location of a device that issued the packet.

In Example 15, at least one of Examples 1-14 can further include, wherein the packet is an extended interest packet or an extended content packet, wherein the packet includes an attribute field including an attribute identifier that indicates an attribute type, an attribute value associated with the attribute type, and a device identifier that indicates a device with which the attribute is associated.

In Example 16, Example 15 can further include, wherein the routing circuitry is configured to update a forwarding information base (FIB) to include the attribute value.

Example 17 can include a non-transitory machine-readable storage device including instructions stored thereon that, when executed by routing circuitry of an information centric network (ICN) router, configure the routing circuitry to receive a packet, receive one or more attributes including at least one of (1) a network attribute, (2) a platform attribute, and (3) a content attribute, determine which neighbor node is to receive the packet next based on the received one or more attributes, and forward the packet to the determined neighbor node.

In Example 18, Example 17 can further include, wherein the instructions for receiving the one or more attributes include instructions for reading the one or more attributes from an extended forwarding information base table in the memory.

In Example 19, at least one of Examples 17-18 can further include, wherein the instructions for receiving the one or more attributes include instructions for reading the one or more attributes from the received packet.

In Example 20, at least one of Examples 17-19 can further include, wherein the instructions for receiving the one or more attributes include instructions for issuing a query to a policy server to retrieve the one or more attributes from the policy server.

In Example 21, at least one of Examples 17-20 can further include, wherein the packet is an extended interest packet and wherein the instructions for receiving the one or more attributes include instructions for reading the one or more attributes from an attribute field of the extended interest packet.

In Example 22, at least one of Examples 17-21 can further include, wherein the packet is an extended content packet and wherein the instructions for receiving the one or more attributes include instructions for reading the one or more attributes from an attribute field of the extended content packet.

In Example 23, at least one of Examples 17-22 can further include, wherein the packet is an extended interest packet or an extended content packet, wherein the packet includes an attribute selection field, wherein the attribute selection field includes data indicating one or more attributes, and wherein the instructions for determining which neighbor node is to receive the packet next include instructions for determining which neighbor node is to receive the packet next further based on the attribute selection field.

In Example 24, Example 23 can further include, wherein the instructions for receiving the one or more attributes includes one or more of: (1) instructions for issuing a query to a policy server to retrieve the one or more attributes from the policy server, (2) instructions for reading the one or more attributes from an extended forwarding information base (FIB) table in the storage device, and (3) instructions for reading the one or more attributes from the received packet.

In Example 25, at least one of Examples 17-24 can further include, wherein the attributes include connectivity interfaces of nodes within an ICN to which the router is connected and one or more attributes of each of the connectivity interfaces.

In Example 26, Example 25 can further include, wherein the attributes of each of the connectivity interfaces include at least two of (1) an average link latency, (2) a maximum link latency, (3) a quality of service, (4) jitter, (5) capacity, and (6) bandwidth available over each of the connectivity interfaces.

In Example 27, Example 26 can further include, wherein a first connectivity interface of the connectivity interfaces includes a wired connection and a second connectivity interface of the connectivity interfaces includes a wireless connection.

In Example 28, at least one of Examples 26-27 can further include, wherein the connectivity interfaces, average link latency, maximum link latency, quality of service, jitter, capacity, and bandwidth are provided by a lower layer of the network relative to the layer on which the ICN router resides.

In Example 29, at least one of Examples 26-28 can further include, wherein the attributes include a link latency for an uplink and a link latency for a downlink for each neighbor node.

In Example 30, at least one of Examples 17-29 can further include, wherein the packet is an extended interest packet, and wherein the attributes include a location of a device that issued the packet.

In Example 31, at least one of Examples 17-30 can further include, wherein the packet is an extended interest packet or an extended content packet, wherein the packet includes an attribute field including an attribute identifier that indicates an attribute type, an attribute value associated with the attribute type, and a device identifier that indicates a device with which the attribute is associated.

In Example 32, Example 31 can further include instructions that, when executed by the routing circuitry, configure the routing circuitry to update a forwarding information base (FIB) to include the attribute value.

Example 33 can include a method performed by routing circuitry of a router of an information centric network (ICN), the method comprising receiving a packet, receive one or more attributes including at least one of (1) a network attribute, (2) a platform attribute, and (3) a content attribute, determining which neighbor node is to receive the packet next based on the received one or more attributes, and forwarding the packet to the determined neighbor node.

In Example 34, Example 33 can further include, wherein receiving the one or more attributes includes reading the one or more attributes from an extended forwarding information base table in the memory.

In Example 35, at least one of Examples 33-34 can further include, wherein receiving the one or more attributes includes reading the one or more attributes from the received packet.

In Example 36, at least one of Examples 33-35 can further include, wherein receiving the one or more attributes includes issuing a query to a policy server to retrieve the one or more attributes from the policy server.

In Example 37, at least one of Examples 33-36 can further include, wherein the packet is an extended interest packet and wherein receiving the one or more attributes includes reading the one or more attributes from an attribute field of the extended interest packet.

In Example 38, at least one of Examples 33-37 can further include, wherein the packet is an extended content packet and wherein receiving the one or more attributes includes reading the one or more attributes from an attribute field of the extended content packet.

In Example 39, at least one of Examples 33-38 can further include, wherein the packet is an extended interest packet or an extended content packet, wherein the packet includes an attribute selection field, wherein the attribute selection field includes data indicating one or more attributes, and wherein determining which neighbor node is to receive the packet next includes for determining which neighbor node is to receive the packet next further based on the attribute selection field.

In Example 40, Example 39 can further include, wherein receiving the one or more attributes includes one or more of: (1) issuing a query to a policy server to retrieve the one or more attributes from the policy server, (2) reading the one or more attributes from an extended forwarding information base (FIB) table in the storage device, and (3) reading the one or more attributes from the received packet.

In Example 41, at least one of Examples 33-40 can further include, wherein the attributes include connectivity interfaces of the neighbor nodes and one or more attributes of each of the connectivity interfaces.

In Example 42, Example 41 can further include, wherein the attributes of each of the connectivity interfaces include at least two of (1) an average link latency, (2) a maximum link latency, (3) a quality of service, (4) jitter, (5) capacity, and (6) bandwidth available over each of the connectivity interfaces.

In Example 43, Example 42 can further include, wherein a first connectivity interface of the connectivity interfaces includes a wired connection and a second connectivity interface of the connectivity interfaces includes a wireless connection.

In Example 44, at least one of Examples 42-43 can further include, wherein the connectivity interfaces, average link latency, maximum link latency, quality of service, jitter, capacity, and bandwidth are provided by a lower layer of the network relative to the layer on which the ICN router resides.

In Example 45, at least one of Examples 42-44 can further include, wherein the attributes include a link latency for an uplink and a link latency for a downlink for each neighbor node.

In Example 46, at least one of Examples 42-45 can further include, wherein the packet is an extended interest packet, and wherein the attributes include a location of a device that issued the packet.

In Example 47, at least one of Examples 33-46 can further include, wherein the packet is an extended interest packet or an extended content packet, wherein the packet includes an attribute field including an attribute identifier that indicates an attribute type, an attribute value associated with the attribute type, and a device identifier that indicates a device with which the attribute is associated.

In Example 48, Example 47 can further include updating a forwarding information base (FIB) to include the attribute value.

Example 49 can include a policy server of an information centric network (ICN), the policy server comprising a memory including policies stored thereon, the policies each including rules defining how routing circuitry of a router of a plurality of routers of the ICN is to determine which node is to receive a packet from the router, and policy processing circuitry coupled to the memory, the policy processing circuitry configured to provide the policies to the plurality of routers.

In Example 50, Example 49 can further include, wherein the policy processing circuitry names each policy using same conventions as a publisher of content in the ICN names content such that an interest packet is issued by a router and a policy named in the interest packet is returned to the router.

In Example 51, at least one of Examples 49-50 can further include, wherein the policy processing circuitry is configured to receive attribute data from the plurality of routers and lower layer circuitry and store the attribute data in the memory.

In Example 52, at least one of Examples 49-51 can further include, wherein the policy processing circuitry is configured to poll the lower circuitry for attribute data.

In Example 53, at least one of Examples 49-52 can further include, wherein the policy processing circuitry is configured to perform analytics on the policy including one or more of: (1) determining which policies reduce a time between content request and content delivery, (2) determining which attributes on which the policies rely effect the time between content request and content delivery, and (3) determining which routing paths include a time between content and content delivery below a specified threshold.

In Example 54, at least one of Examples 49-53 can further include, wherein the policy processing circuitry is further configured to provide a requested policy to a router of the plurality of routers in response to receiving a request for the policy.

In Example 55, Example 54 can further include, wherein the policy processing circuitry is further configured to, in response to receiving the request for the policy, provide the requested policy to the router and one or more direct neighbor routers of the router.

Example 56 can include a non-transitory machine-readable storage device including instructions stored thereon that, when executed by policy processing circuitry of a policy server of an information centric network (ICN), configure the policy processing circuitry to receive, from lower layer circuitry, attribute data indicating network attributes of routers of the ICN, the network attributes including at least one of (1) an average link latency, (2) maximum link latency, (3) quality of service, (4) jitter, (5) capacity, and (6) bandwidth and a type of connectivity of a plurality of connectivity interfaces of the routers, receive, from a router of the routers, a request for a policy of policies in a memory of the policy server, and in response to receiving the request, provide one or more attributes of the network attributes and the policy to be applied using the one or more attributes to the router.

In Example 57, Example 56 can further include instructions that, when executed by the processing circuitry, configure the processing circuitry to issue, to the lower layer circuitry, a request for updated attribute data.

In Example 58, Example 57 can further include wherein the instructions for issuing the request for the updated attribute data include instructions for periodically issuing, at fixed time intervals, the request for the updated attribute data.

In Example 59, Example 58 can further include instructions that, when executed by the processing circuitry, configure the processing circuitry to perform analytics on data provided by at least one of the lower layer circuitry and the routers to determine which policies provide a time between issuance of an interest packet and fulfillment of the interest packet below a specified threshold.

In Example 60, Example 59 can further include instructions that, when executed by the processing circuitry, configure the processing circuitry to modify, based on the analytics, a policy of the policies to reduce a time between issuance of the interest packet and fulfillment of the interest packet.

In Example 61, at least one of Examples 59-60 can further include, wherein the instructions for providing the policy include instructions for providing the policy further based on data in an attribute selection field of an extended interest packet or an extended content packet.

In Example 62, at least one of Examples 59-61 can further include instructions that, when executed by the processing circuitry, configure the processing circuitry to receive, from a router of the routers, a request for a policy of the policies, and provide, in response to receiving the request, providing the policy to the router and one or more neighbor routers of the router.

Example 63 can include a method performed by a policy server of an information centric network (ICN), the method comprising receiving, by an application programming interface (API) of the policy server and from lower layer circuitry, attribute data indicating network attributes of routers of the ICN, the network attributes including link latency and a type of connectivity of a plurality of connectivity interfaces of the routers, receiving, from a router of the routers, a request for a policy of policies in a memory of the policy server, and in response to receiving the request, providing, by policy processing circuitry of the policy server, one or more attributes of the network attributes and the policy to be applied using the one or more attributes to the router.

In Example 64, Example 63 can further include issuing, by the API and to the lower layer circuitry, a request for updated attribute data.

In Example 65, Example 64 can further include issuing the request for the updated attribute data includes periodically issuing, at fixed time intervals, the request for the updated attribute data.

In Example 66, Example 65 can further include performing analytics on data provided by at least one of the lower layer circuitry and the routers to determine which policies provide a time between issuance of an interest packet and fulfillment of the interest packet below a specified threshold.

In Example 67, Example 66 can further include modifying, based on the analytics, a policy of the policies to reduce a time between issuance of the interest packet and fulfillment of the interest packet.

In Example 68, at least one of Examples 66-67 can further include, wherein providing the policy includes providing the policy further based on data in an attribute selection field of an extended interest packet or an extended content packet.

In Example 69, at least one of Examples 66-68 can further include receiving, by a router of the routers, a request for a policy of the policies, and providing, in response to receiving the request, providing the policy to the router and one or more neighbor routers of the router.

Example 70 can include an information centric networking (ICN) system comprising a plurality of routers, each of the plurality of routers comprising a memory and routing circuitry coupled to the memory, the routing circuitry configured to receive a packet, receive one or more attributes including at least one of (1) a network attribute, (2) a platform attribute, and (3) a content attribute, determine which neighbor node is to receive the packet next by applying the received attributes to a policy, and forward the packet to the determined neighbor node, and a policy server comprising a memory including policies stored thereon, the policies each including rules defining how routing circuitry of a router of a plurality of router of the ICN is to determine which node is to receive a packet from the router, and policy processing circuitry coupled to the memory, the policy processing circuitry configured to provide the policies to the plurality of routers.

In Example 71, Example 70 can further include, wherein the routing circuitry configured to receive the one or more attributes includes the routing circuitry configured to read the one or more attributes from an extended forwarding information base table in the memory.

In Example 72, at least one of Examples 70-71 can further include, wherein the routing circuitry configured to receive the one or more attributes includes the routing circuitry configured to read the one or more attributes from the received packet.

In Example 73, at least one of Examples 70-72 can further include, wherein the routing circuitry configured to receive the one or more attributes includes the routing circuitry configured to issue a query to the policy server to retrieve the one or more attributes from the policy server.

In Example 74, at least one of Examples 70-73 can further include, wherein the packet is an extended interest packet and wherein the routing circuitry configured to receive the one or more attributes includes the routing circuitry configured to read the one or more attributes from an attribute field of the extended interest packet.

In Example 75, at least one of Examples 70-74 can further include, wherein the packet is an extended content packet and wherein the routing circuitry configured to receive the one or more attributes includes the routing circuitry configured to read the one or more attributes from an attribute field of the extended content packet.

In Example 76, at least one of Examples 70-71 can further include, wherein the packet is an extended interest packet or an extended content packet, wherein the packet includes an attribute selection field, wherein the attribute selection field includes data indicating one or more attributes to be used by the routing circuitry in the determination of which neighbor node is to receive the packet next.

In Example 77, at least one of Examples 70-76 can further include, wherein the routing circuitry configured to receive the one or more attributes includes one or more of: (1) the routing circuitry configured to issue a query to a policy server to retrieve the one or more attributes from the policy server, (2) the routing circuitry configured to read the one or more attributes from an extended forwarding information base table in the memory, and (3) the routing circuitry configured to read the one or more attributes from the received packet.

In Example 78, at least one of Examples 70-77 can further include, wherein the attributes include connectivity interfaces of the neighbor nodes and one or more attributes of each of the connectivity interfaces.

In Example 79, Example 78 can further include, wherein the attributes of each of the connectivity interfaces include at least two of (1) an average link latency, (2) maximum link latency, (3) quality of service, (4) jitter, (5) capacity, and (6) bandwidth available over each of the connectivity interfaces.

In Example 80, Examples 79 can further include, wherein a first connectivity interface of the connectivity interfaces includes a wired connection and a second connectivity interface of the connectivity interfaces includes a wireless connection.

In Example 81, at least one of Examples 79-80 can further include, wherein the connectivity interfaces, average link latency, and quality of service are provided by a lower layer of the network relative to the layer on which the ICN router resides.

In Example 82, at least one of Examples 79-81 can further include, wherein the attributes include a link latency for an uplink and a link latency for a downlink for each neighbor node.

In Example 83, at least one of Examples 70-82 can further include, wherein the packet is an extended interest packet, and wherein the attributes include a location of a device that issued the packet.

In Example 84, at least one of Examples 70-83 can further include, wherein the packet is an extended interest packet or an extended content packet, wherein the packet includes an attribute field including an attribute identifier that indicates an attribute type, an attribute value associated with the attribute type, and a device identifier that indicates a device with which the attribute is associated.

In Example 85, Example 84 can further include, wherein the routing circuitry is configured to update a forwarding information base (FIB) to include the attribute value.

In Example 86, at least one of Examples 70-85 can further include, wherein the policy processing circuitry names each policy using same conventions as a publisher of content in the ICN names content such that an interest packet is issued by a router and a policy named in the interest packet is returned to the router.

In Example 87, at least one of Examples 70-86 can further include, wherein the policy processing circuitry is configured to receive attribute data from the plurality of routers and lower layer circuitry and store the attribute data in the memory.

In Example 88, at least one of Examples 70-87 can further include, wherein the policy processing circuitry is configured to poll the lower circuitry for attribute data.

In Example 89, at least one of Examples 70-88 can further include, wherein the policy processing circuitry is configured to perform analytics on the policy including one or more of: (1) determining which policies reduce a time between content request and content delivery, (2) determining which attributes on which the policies rely effect the time between content request and content delivery, and (3) determining which routing paths include a time between content and content delivery below a specified threshold.

In Example 90, at least one of Examples 70-89 can further include, wherein the policy processing circuitry is further configured to provide a requested policy to a router of the plurality of routers in response to receiving a request for the policy.

In Example 91, Example 90 can further include, wherein the policy processing circuitry is further configured to, in response to receiving the request for the policy, provide the requested policy to the router and one or more direct neighbor routers of the router.

Each of these non-limiting examples can stand on its own, or can be combined in various permutations or combinations with one or more of the other examples. Non-transitory merely means that the medium is a tangible media.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An information centric network (ICN) router comprising:
a memory;
routing circuitry coupled to the memory, the routing circuitry configured to receive a packet and determine a neighbor node of the neighbor nodes to receive the packet next, the routing circuitry operating on a first network layer;
lower layer circuitry configured to identify attributes including respective connectivity interfaces of neighbor nodes within the ICN to which the router is connected, average link latency of the connectivity interfaces, and a quality of service of the connectivity interfaces, the lower layer circuitry operating on a second network layer lower than the first network layer; and
interface circuitry connected between the lower layer circuitry and the routing circuitry to permit communication of the attributes from the second network layer to the first network layer;
wherein the routing circuitry is configured to determine the neighbor node of the neighbor nodes to receive the packet next based on the attributes from the lower layer circuitry, and forward the packet to the determined neighbor node.

2. The ICN router of claim 1, wherein the routing circuitry is further configured to read one or more further attributes from an extended forwarding information base table in the memory.

3. The ICN router of claim 1, wherein the routing circuitry is further configured to receive one or more further attributes from the received packet.

4. The ICN router of claim 1, wherein the routing circuitry is further configured to issue a query to a policy server to retrieve one or more further attributes from the policy server.

5. The ICN router of claim 1, wherein the packet is an extended interest packet and wherein the routing circuitry is further configured to receive one or more further attributes from an attribute field of the extended interest packet.

6. The ICN router of claim 1, wherein the packet is an extended content packet and wherein the routing circuitry is further configured to receive one or more further attributes from an attribute field of the extended content packet.

7. The ICN router of claim 1, wherein the packet is an extended interest packet or an extended content packet, wherein the packet includes an attribute selection field, wherein the attribute selection field includes data indicating one or more further attributes to be used by the routing circuitry in the determination of which neighbor node is to receive the packet next.

8. The ICN router of claim 7, wherein the routing circuitry is further configured to receive one or more further attributes by one or more of: (1) issuing a query to a policy server to retrieve the one or more further attributes from the policy server, (2) reading the one or more further attributes from an extended forwarding information base table in the memory, or (3) reading the one or more further attributes from the received packet.

9. The ICN router of claim 1, wherein the attributes of each of the connectivity interfaces further include one or more of (1) a maximum link latency, (2) jitter, (3) capacity, or (4) bandwidth available over each of the connectivity interfaces.

10. The ICN router of claim 9, wherein a first connectivity interface of the connectivity interfaces includes a wired connection and a second connectivity interface of the connectivity interfaces includes a wireless connection.

11. The ICN router of claim 9, wherein the attributes include a link latency for an uplink and a link latency for a downlink for each neighbor node.

12. The ICN router of claim 1, wherein the packet is an extended interest packet, and wherein the attributes include a location of a device that issued the packet.

13. A non-transitory machine-readable storage device including instructions stored thereon that, when executed by routing circuitry of an information centric network (ICN) router, configure the routing circuitry to:
operate on a first network layer of the ICN;
receive a packet;
receive attributes from a lower layer circuitry through an interface circuitry, the attributes including respective connectivity interfaces of neighbor nodes within the ICN to which the router is connected, average link latency of the connectivity interfaces, and a quality of service of the connectivity interfaces, the lower layer circuitry configured to operate at a second network layer of the ICN lower than the first network layer, and the interface circuitry configured to permit communication of the attributes from the second network layer to the first network layer;
determine which neighbor node of the neighbor nodes is to receive the packet next based on the identified attributes; and
forward the packet to the determined neighbor node.

14. The storage device of claim 13, wherein the packet is an extended interest packet, and wherein the attributes include a location of a device that issued the packet.

15. The storage device of claim 13, wherein the packet is an extended interest packet or an extended content packet, wherein the packet includes an attribute field including an attribute identifier that indicates an attribute type, an attribute value associated with the attribute type, and a device identifier that indicates a device with which the attribute is associated.

16. The storage device of claim 13, further comprising instructions that, when executed by the routing circuitry, configure the routing circuitry to update a forwarding information base (FIB) to include the attribute value.

17. A policy server of an information centric network (ICN), the policy server comprising:
a memory including policies stored thereon, the policies each including rules defining how a router of the ICN is to forward packets received at the router;
policy processing circuitry coupled to the memory, the policy processing circuitry configured to provide the policies to the router, the router operating on a first network layer of the ICN;
lower level circuitry operating on a second network layer of the ICN lower than the first network layer, the lower level circuitry configured to provide one or more attributes including a connectivity interface of a neighbor node within the ICN to which the router is connected, average link latency of the connectivity interface, and quality of service of the connectivity interface; and
interface circuitry connected between the lower layer circuitry and the policy processing circuitry to permit communication of the attributes from the second network layer to the first network layer;
wherein the processing circuitry is configured to provide a policy of the policies indicating a rule based on the attributes from the second network layer.

18. The policy server of claim 17, wherein the policy processing circuitry names each policy using same conventions as a publisher of content in the ICN names content such that an interest packet is issued by a router and a policy named in the interest packet is returned to the router.

19. The policy server of claim 17, wherein the policy processing circuitry is configured to receive further attribute data from the plurality of routers and the lower layer circuitry and store the further attribute data in the memory.

20. The policy server of claim 17, wherein the policy processing circuitry is configured to poll the lower layer circuitry for attribute data.

21. The policy server of claim 17, wherein the policy processing circuitry is configured to perform analytics on the policy including one or more of: (1) determining which policies reduce a time between content request and content delivery, (2) determining which attributes on which the policies rely effect the time between content request and content delivery, and (3) determining which routing paths include a time between content and content delivery below a specified threshold.

22. The policy server of claim 17, wherein the policy processing circuitry is further configured to provide a requested policy to the router in response to receiving a request for the policy.

23. The policy server of claim 22, wherein the policy processing circuitry is further configured to, in response to receiving the request for the policy, provide the requested policy to the router and one or more direct neighbor routers of the router.

* * * * *